United States Patent
Cheon et al.

(10) Patent No.: US 10,225,551 B2
(45) Date of Patent: Mar. 5, 2019

(54) METHOD AND APPARATUS FOR ENCODING AND DECODING IMAGE BY USING LARGE TRANSFORM UNIT

(71) Applicant: SAMSUNG ELECTRONICS CO., LTD., Suwon-si (KR)

(72) Inventors: Min-su Cheon, Suwon-si (KR); Woo-jin Han, Suwon-si (KR); Hae-kyung Jung, Seoul (KR); Il-koo Kim, Osan-si (KR); Tammy Lee, Seoul (KR); Jianle Chen, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/918,347

(22) Filed: Mar. 12, 2018

(65) Prior Publication Data
US 2018/0205950 A1    Jul. 19, 2018

Related U.S. Application Data

(63) Continuation of application No. 15/416,776, filed on Jan. 26, 2017, now Pat. No. 9,942,549, which is a (Continued)

(30) Foreign Application Priority Data

Jan. 14, 2010 (KR) .................. 10-2010-0003558

(51) Int. Cl.
*H04N 19/122* (2014.01)
*G06T 9/00* (2006.01)
(Continued)

(52) U.S. Cl.
CPC ............. *H04N 19/122* (2014.11); *G06T 9/00* (2013.01); *H04N 19/107* (2014.11);
(Continued)

(58) Field of Classification Search
CPC .. H04N 19/122; H04N 19/103; H04N 19/503; H04N 19/176; H04N 19/109;
(Continued)

(56) References Cited

U.S. PATENT DOCUMENTS 5,060,285 A    10/1991  Dixit et al.
5,446,806 A    8/1995   Ran et al.
(Continued)

FOREIGN PATENT DOCUMENTS

CN    1523893 A    8/2004
CN    1700772 A    11/2005
(Continued)

OTHER PUBLICATIONS

International Search Report (PCT/ISA210) and Written Opinion (PCT/ISA/237) dated Sep. 9, 2011, in counterpart International Application No. PCT/KR2011/000303.
(Continued)

*Primary Examiner* — Carol Wang
(74) *Attorney, Agent, or Firm* — Sughrue Mion, PLLC

(57) ABSTRACT

A method of decoding an image in which wherein, when a prediction mode is an inter prediction mode, not an intra prediction mode, a size of at least one prediction unit in the coding unit is determined independently from a size of at least one transformation unit in the coding unit.

4 Claims, 17 Drawing Sheets

US 10,225,551 B2
Page 2

Related U.S. Application Data continuation of application No. 14/609,643, filed on Jan. 30, 2015, now Pat. No. 9,584,821, which is a continuation of application No. 14/299,427, filed on Jun. 9, 2014, now Pat. No. 8,971,654, which is a continuation of application No. 13/006,652, filed on Jan. 14, 2011, now Pat. No. 8,842,927.

(51) Int. Cl.

| | |
|---|---|
| *H04N 19/503* | (2014.01) |
| *H04N 19/176* | (2014.01) |
| *H04N 19/119* | (2014.01) |
| *H04N 19/147* | (2014.01) |
| *H04N 19/61* | (2014.01) |
| *H04N 19/96* | (2014.01) |
| *H04N 19/91* | (2014.01) |
| *H04N 19/13* | (2014.01) |
| *H04N 19/182* | (2014.01) |
| *H04N 19/30* | (2014.01) |
| *H04N 19/50* | (2014.01) |
| *H04N 19/60* | (2014.01) |
| *H04N 19/107* | (2014.01) |
| *H04N 19/124* | (2014.01) |
| *H04N 19/159* | (2014.01) |

(52) U.S. Cl.
CPC ......... *H04N 19/119* (2014.11); *H04N 19/124* (2014.11); *H04N 19/13* (2014.11); *H04N 19/147* (2014.11); *H04N 19/159* (2014.11); *H04N 19/176* (2014.11); *H04N 19/182* (2014.11); *H04N 19/30* (2014.11); *H04N 19/50* (2014.11); *H04N 19/503* (2014.11); *H04N 19/60* (2014.11); *H04N 19/61* (2014.11); *H04N 19/91* (2014.11); *H04N 19/96* (2014.11)

(58) Field of Classification Search
CPC ...... H04N 19/11; H04N 19/30; H04N 19/593; H04N 19/105; H04N 19/18; H04N 19/182; H04N 19/96; H04N 19/17
See application file for complete search history.

(56) References Cited

U.S. PATENT DOCUMENTS

| | | | |
|---|---|---|---|
| 6,061,474 A | 5/2000 | Kajiwara et al. | |
| 7,529,302 B2 | 5/2009 | Mukerjee et al. | |
| 8,086,052 B2 | 12/2011 | Toth et al. | |
| 8,213,501 B2 | 7/2012 | Boon et al. | |
| 8,363,936 B2 | 1/2013 | Divorra Escoda et al. | |
| 8,401,079 B2 | 3/2013 | Sekiguchi et al. | |
| 8,798,159 B2 | 8/2014 | Han et al. | |
| 8,831,097 B2 | 9/2014 | Jung et al. | |
| 8,842,927 B2 | 9/2014 | Cheon et al. | |
| 8,885,959 B2 | 11/2014 | Cheon et al. | |
| 8,891,893 B2 | 11/2014 | Cheon et al. | |
| 8,923,641 B2 | 12/2014 | Cheon et al. | |
| 8,971,653 B2 | 3/2015 | Cheon et al. | |
| 8,971,654 B2 | 3/2015 | Cheon et al. | |
| 9,008,451 B2 | 4/2015 | Lee et al. | |
| 9,584,821 B2 | 2/2017 | Cheon et al. | |
| 2005/0013366 A1 | 1/2005 | Gallant et al. | |
| 2005/0114093 A1 | 5/2005 | Cha et al. | |
| 2005/0135691 A1 | 6/2005 | Reese | |
| 2005/0249291 A1 | 11/2005 | Gordon et al. | |
| 2006/0115168 A1 | 6/2006 | Kobayashi | |
| 2006/0215759 A1 | 9/2006 | Mori | |
| 2006/0227881 A1 | 10/2006 | Gordon | |
| 2006/0251330 A1 | 11/2006 | Toth et al. | |
| 2007/0019872 A1 | 1/2007 | Birinov et al. | |
| 2007/0025631 A1 | 2/2007 | Kim et al. | |
| 2008/0198928 A1 | 8/2008 | Fujisawa et al. | |
| 2009/0034856 A1 | 2/2009 | Moriya et al. | |
| 2009/0238271 A1 | 9/2009 | Kim et al. | |
| 2010/0086034 A1 | 4/2010 | Park et al. | |
| 2011/0038554 A1 | 2/2011 | Lee et al. | |
| 2012/0269274 A1 | 10/2012 | Kim et al. | |
| 2014/0286426 A1 | 9/2014 | Lee et al. | |
| 2014/0294084 A1 | 10/2014 | Cheon | |
| 2015/0326879 A1 | 11/2015 | Alshina et al. | |

FOREIGN PATENT DOCUMENTS

| | | |
|---|---|---|
| CN | 1857001 A | 11/2006 |
| CN | 101507280 A | 8/2009 |
| EP | 2629518 A2 | 8/2013 |
| EP | 2629528 A2 | 8/2013 |
| JP | 200927759 A | 2/2009 |
| JP | 2013-502145 A | 1/2013 |
| JP | 2013-509080 A | 3/2013 |
| JP | 2013-509788 A | 3/2013 |
| JP | 2013-513330 A | 4/2013 |
| WO | 95/14349 A1 | 5/1995 |
| WO | 2004/104930 A2 | 12/2004 |
| WO | 2008/027192 A2 | 3/2008 |
| WO | 2008/088140 A1 | 7/2008 |
| WO | 2010002214 A2 | 1/2010 |

OTHER PUBLICATIONS

Extended European Search Report, dated Nov. 25, 2013, issued by the European Patent Office, in counterpart Application No. 11733110.8.

Mathias Wien, "Variable Block-Size Transforms for Hybrid Video Coding", Feb. 3, 2004, 183 pages.

Ken McCann et al., "Samsung's Response to the Call for Proposals on Video Compression Technology", Joint Collaborative Team on Video Coding (JCT-VC) of ITU-T SG16 WP3 and ISO/IEC JTC1/SC29/WG11, 1st Meeting: Dresden, DE, Apr. 15-23, 2010, pp. 1-42.

Siwei Ma et al., "High-definition Video Coding with Super-macroblocks", Visual Communications and Image Processing, Jan. 1, 2007, SPIE vol. 6508, 16-1-16-12.

Cixun Zhang et al., "Video Coding Using Variable Block-Size Spatially Varying Transforms", Acoustics, Speech and Signal Processing, 2009. ICASSP 2009. IEEE International Conference on IEEE, Piscataway, NJ, USA, 2009, p. 905-908.

P. Chen et al., "Video Coding Using Extended Block Sizes", ITU—Telecommunications Standardization Sector, Study Group 16 Question 6, Video Coding Experts Group, 36th Meeting: San Diego, USA, Oct. 8-10, 2008, p. 1-3.

Tzu-Der Chuang et al., "Algorithm and Architecture Design for Intra Prediction in H.264/AVC High Profile", Picture Coding Symposium, Lisbon, Nov. 7, 2007, 5 pages.

Communication, dated Apr. 16, 2014, issued by the Korean Intellectual Property Office in counterpart Korean Application No. 10-2010-0003558.

Communication dated Nov. 4, 2014 issued by the State Intellectual Property Office of the People's Republic of China in counterpart Chinese Patent Application No. 201180013432.0.

Communication dated Oct. 21, 2014, issued by the Japanese Patent Office in counterpart Japanese Application No. 2012-548897.

Communication from the Korean Intellectual Property Office dated May 6, 2015 in a counterpart Korean application No. 10-2014-0054388.

Communication from the European Patent Office dated May 8, 2015 in a counterpart European Application No. 11 733 110.8.

Thomas Wiegand, et al., "Overview of the H.264/AVC video coding standard", IEEE Transactions on Circuits and Systems for Video Technology, IEEE Service Center, Piscataway, NJ, US, vol. 13, No. 7, Jul. 1, 2003 (Jul. 1, 2003), pp. 560-576, XP011221093, pp. 560-576.

Communication dated Jul. 29, 2015, issued by the Korean Intellectual Property Office in counterpart Korean Patent Application No. 10-2015-0049071.

(56) References Cited

OTHER PUBLICATIONS

Communication dated Dec. 15, 2015, issued by the Japanese Intellectual Property Office in counterpart Japanese Application No. 2015-054134.
Communication dated Dec. 15, 2015, issued by the Japanese Intellectual Property Office in counterpart Japanese Application No. 2015-054135.
Communication dated Dec. 15, 2015, issued by the Japanese Intellectual Property Office in counterpart Japanese Application No. 2015-054136.
Communication dated Dec. 15, 2015, issued by the Japanese Intellectual Property Office in counterpart Japanese Application No. 2015-054137.
Communication dated Feb. 3, 2016, issued by the State Intellectual Property Office of P.R. China in counterpart Chinese Application No. 201510134277.8.
Communication (Search Report) dated Feb. 12, 2016, issued by the European Patent Office in counterpart European Application No. 15183034.6.
Communication (Search Report) dated Feb. 12, 2016, issued by the European Patent Office in counterpart European Application No. 15183036.1.
Communication (Search Report) dated Feb. 12, 2016, issued by the European Patent Office in counterpart European Application No. 15183038.7.
Communication (Search Report) dated Feb. 12, 2016, issued by the European Patent Office in counterpart European Application No. 15183039.5.
Communication (Office Action) dated Feb. 29, 2016, issued by the European Patent Office in counterpart European Application No. 15183036.1.
Communication (Office Action) dated Feb. 29, 2016, issued by the European Patent Office in counterpart European Application No. 15183038.7.
Communication (Office Action) dated Feb. 29, 2016, issued by the European Patent Office in counterpart European Application No. 15183039.5.
S. Naito et al., "Efficient coding scheme for super high definition video based on extending H.264 high profile", Proceedings of SPIE, S P I E—International Society for Optical Engineering, US, vol. 6077, No. 67727, Jan. 18, 2006, pp. 607727-1-607727-8, XP 002538136.
QUALCOMM Inc., "Video Coding Using Extended Block Sizes Q6/16", ITU-T SG16 Meeting; Jan. 27, 2009-Feb. 6, 2009; Geneva, No. T09-SG16-C-0123, Jan. 19, 2009, Total 4 pages, XP030003764.
Communication dated Jul. 8, 2016, issued by the Korean Intellectual Property Office in counterpart Korean Patent Application No. 10-2016-0063730.
Communication dated May 3, 2017, issued by the State Intellectual Property Office of the People's Republic of China in counterpart Chinese Patent Application No. 201510134292.2.
Communication dated Jun. 20, 2017, issued by the State Intellectual Property Office of the People's Republic of China in counterpart Chinese Patent Application No. 201510131900.4.
Communication dated Jul. 10, 2017, issued by the Korean Intellectual Property Office in counterpart Korean Patent Application No. 10-2017-0035507.
Communication dated Sep. 4, 2017 issued by the State Intellectual Property Office of P.R. China in counterpart Application No. 201510289124.0.
Communication dated Oct. 13, 2017 issued by the Intellectual Property of India in counterpart Application No. 1924/MUMNP/2012.
Communication dated Aug. 9, 2018, issued by the Korean Intellectual Property Office in corresponding Korean Application No. 10-2018-0052803.
Jaeil Kim et al. "Enlarging MB size for high fidelity video coding beyond HD" Video Coding Experts Group (VCEG), 36th Meeting: San Diego, USA, Oct. 8-10, 2008, Document VCEG-AJ21 (6 pages total).

CODING UNIT

PREDICTION UNIT

PREDICTION UNIT

TRANSFORM UNIT

METHOD AND APPARATUS FOR ENCODING AND DECODING IMAGE BY USING LARGE TRANSFORM UNIT

CROSS-REFERENCE TO RELATED PATENT APPLICATION

This application is a continuation of U.S. patent application Ser. No. 15/416,776 filed on Jan. 26, 2017, in the U.S. Patent and Trademark Office, which is a continuation of U.S. patent application Ser. No. 14/609,643 filed on Jan. 30, 2015, in the U.S. Patent and Trademark Office, now U.S. Pat. No. 9,584,821, issued on Feb. 28, 2017, which is a continuation of U.S. patent application Ser. No. 14/299,427 filed on Jun. 9, 2014, in the U.S. Patent and Trademark Office, now U.S. Pat. No. 8,971,654, issued on Mar. 3, 2015, which is a continuation of U.S. patent application Ser. No. 13/006,652, filed on Jan. 14, 2011, in the U.S. Patent and Trademark Office, now U.S. Pat. No. 8,842,927, which claims priority from Korean Patent Application No. 10-2010-0003558, filed on Jan. 14, 2010, in the Korean Intellectual Property Office, the disclosures of which are incorporated herein by reference in their entireties.

BACKGROUND

1. Field

Exemplary embodiments relate to a method and apparatus for encoding and decoding an image, and more particularly, to a method and apparatus for encoding and decoding an image by transforming a pixel domain image to coefficients of a frequency domain.

2. Description of the Related Art

In most methods and apparatuses for encoding and decoding an image, an image of a pixel domain is transformed to a frequency domain and the transformed image is encoded to compress the image. Discrete cosine transform (DCT) is a well-known technology used to compress audio/video (AV) data. In recent years, many attempts to find more efficient encoding methods have been made. In audio coding, parametric coding performs better than DCT and, in two-dimensional data, Karhunen Loeve transform (KLT) has a minimum bit size but has a large overhead size.

SUMMARY

Exemplary embodiments provide a method and apparatus for encoding and decoding an image by using effective discrete cosine transform (DCT), and a computer readable recording medium having recorded thereon a computer program for executing the encoding and decoding.

According to an aspect of an exemplary embodiment, there is provided a method of encoding an image, the method including: performing prediction on a plurality of coding units of the image and generating a plurality of prediction units based on the predicted plurality of coding units; grouping the plurality of prediction units into a transform unit; transforming residual values included in the grouped plurality of prediction units into a frequency domain, based on the transform unit, into frequency component coefficients of the frequency domain; quantizing the frequency component coefficients; and entropy-encoding the quantized frequency component coefficients.

The grouping may include grouping comprises grouping the plurality of prediction units based on depths of the plurality of prediction units that indicate a degree of hierarchically decreasing a maximum coding unit to the plurality of coding units.

The grouping may include grouping comprises selecting adjacent prediction units among the plurality of prediction units on which prediction is performed according to a type of prediction mode.

The performing prediction may include generating residual values of the plurality of coding units by intra predicting a prediction unit that is predicted from among the plurality of prediction units, based on prediction values of at least one adjacent prediction unit among the plurality of prediction units.

The performing prediction may include generating residual values of the plurality of coding units by inter predicting all prediction units included in the plurality of coding units.

According to another aspect of an exemplary embodiment, there is provided an apparatus for encoding an image, the apparatus including: a predictor that performs prediction on a plurality of coding units of the image and generates a plurality of prediction units based on the predicted plurality of coding units; a transformer that groups the plurality of prediction units into a transform unit and transforms residual values included in the grouped plurality of prediction units into a frequency domain, based on the transform unit, into frequency component coefficients of the frequency domain; a quantizer that quantizes the frequency component coefficients; and an entropy encoder that entropy-encodes the quantized frequency component coefficients.

According to another aspect of an exemplary embodiment, there is provided a method of decoding an image, the method including: entropy-decoding frequency component coefficients of a frequency domain generated from transformed residual values of a plurality of prediction units of a transform unit, the plurality of prediction units included in a plurality of coding units of the image; inverse-quantizing the entropy-decoded frequency component coefficients; inverse-transforming the inverse-quantized frequency component coefficients into a pixel domain as restored residual values of the plurality of coding units included in the transform unit; and restoring the plurality of coding units based on the restored residual values.

According to another aspect of an exemplary embodiment, there is provided an apparatus for decoding an image, the apparatus including: an entropy decoder that entropy-encodes frequency component coefficients of a frequency domain generated from transformed residual values of plurality of prediction units of a transform unit, the plurality of prediction units included in a plurality of coding units of the image; an inverse quantizer that inverse-quantizes the entropy-decoded frequency component coefficients; an inverse transformer that inverse-transforms the inverse-quantized frequency component coefficients into a pixel domain as restored residual values of the plurality of coding units included in the transform unit; and a restorer that restores the plurality of coding units based on the restored residual values.

According to another aspect of an exemplary embodiment, there is provided a computer readable recording medium having recorded thereon a program for executing the method of decoding and the method of encoding.

BRIEF DESCRIPTION OF THE DRAWINGS

The above and/or other aspects will become more apparent by describing certain exemplary embodiments, with reference to the accompanying drawings, in which.

DETAILED DESCRIPTION OF THE EXEMPLARY EMBODIMENTS

Figure 1:
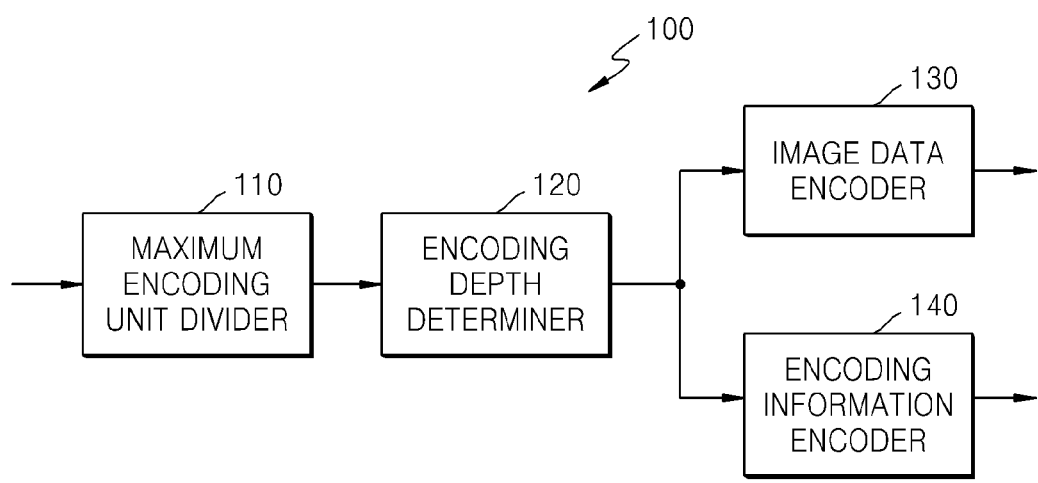
FIG. 1 is a block diagram of an apparatus for encoding an image, according to an exemplary embodiment.

Certain exemplary embodiments are described in greater detail below with reference to the accompanying drawings. Expressions such as "at least one of," when preceding a list of elements, modify the entire list of elements and do not modify the individual elements of the list. In the present specification, an "image" may denote a still image for a video or a moving image, that is, the video itself.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters.

FIG. 1 is a block diagram of an image encoding apparatus 100 for encoding an image, according to an exemplary embodiment. The image encoding apparatus 100 may be implemented as a hardware apparatus such as, for example, a processor of a computer or a computer system. The image encoding apparatus 100 may be also implemented as a software module residing on the computer system.

Referring to FIG. 1, the image encoding apparatus 100 includes a maximum encoding unit divider 110, an encoding depth determiner 120, an image data encoder 130, and an encoding information encoder 140 which may be implemented, for example, as hardware or software modules integrated within the image encoding apparatus 100 or separately from the image encoding apparatus 100.

The maximum encoding unit divider 110 may divide a current frame or slice based on a maximum coding unit that is a coding unit of the largest size. That is, the maximum encoding unit divider 110 may divide the current frame or slice into at least one maximum coding unit.

According to an exemplary embodiment, a coding unit may be represented using a maximum coding unit and a depth. As described above, the maximum coding unit indicates a coding unit having the largest size from among coding units of the current frame, and the depth indicates a degree of hierarchically decreasing the coding unit. As a depth increases, a coding unit may decrease from a maximum coding unit to a minimum coding unit, wherein a depth of the maximum coding unit is defined as a minimum depth and a depth of the minimum coding unit is defined as a maximum depth. Since the size of a coding unit decreases from a maximum coding unit as a depth increases, a sub coding unit of a kth depth may include a plurality of sub coding units of a (k+n)th depth (k and n are integers equal to or greater than 1).

According to an increase of the size of a frame to be encoded, encoding an image in a greater coding unit may cause a higher image compression ratio. However, if a greater coding unit is fixed, an image may not be efficiently encoded by reflecting continuously changing image characteristics.

For example, when a smooth area such as the sea or sky is encoded, the greater a coding unit is, the more a compression ratio may increase. However, when a complex area such as people or buildings is encoded, the smaller a coding unit is, the more a compression ratio may increase.

Accordingly, in an exemplary embodiment, a different maximum image coding unit and a different maximum depth are set for each frame or slice. Since a maximum depth denotes the maximum number of times by which a coding unit may decrease, the size of each minimum coding unit included in a maximum image coding unit may be variably set according to a maximum depth. The maximum depth may be determined differently for each frame or slice or for each maximum coding unit.

The encoding depth determiner 120 determines a division shape of the maximum coding unit. The division shape may be determined based on calculation of rate-distortion (RD) costs. The determined division shape of the maximum coding unit is provided to the encoding information encoder 140, and image data according to maximum coding units is provided to the image data encoder 130.

A maximum coding unit may be divided into sub coding units having different sizes according to different depths, and the sub coding units having different sizes, which are included in the maximum coding unit, may be predicted or frequency-transformed based on processing units having different sizes. In other words, the image encoding apparatus 100 may perform a plurality of processing operations for image encoding based on processing units having various sizes and various shapes. To encode image data, processing operations such as prediction, transformation, and entropy encoding are performed, wherein processing units having the same size or different sizes may be used for every operation.

For example, the image encoding apparatus 100 may select a processing unit that is different from a coding unit to predict the coding unit.

When the size of a coding unit is 2N×2N (where N is a positive integer), processing units for prediction may be 2N×2N, 2N×N, N×2N, and N×N. In other words, motion prediction may be performed based on a processing unit having a shape, whereby at least one of a height and a width of a coding unit is equally divided by two. Hereinafter, a processing unit, which is the base of prediction, is defined as a prediction unit.

A prediction mode may be at least one of an intra mode, an inter mode, and a skip mode, and a specific prediction mode may be performed for only a prediction unit having a specific size or a specific shape. For example, the intra mode may be performed for only prediction units having the sizes of 2N×2N or N×N and the shape of a square. Further, the skip mode may be performed for only a prediction unit having the size of 2N×2N. If a plurality of prediction units exist in a coding unit, the prediction mode with the fewest encoding errors may be selected after performing prediction for every prediction unit.

Alternatively, the image encoding apparatus 100 may perform frequency transform on image data based on a processing unit having a size different from a size of the coding unit. For the frequency transform in the coding unit, the frequency transform may be performed based on a processing unit having a size equal to or smaller than that of the coding unit. Hereinafter, a processing unit, which is the base of frequency transform, is defined as a transform unit. The frequency transform may be discrete cosine transform (DCT) or Karhunen Loeve transform (KLT).

The encoding depth determiner 120 may determine sub coding units included in a maximum coding unit using RD optimization based on a Lagrangian multiplier. In other words, the encoding depth determiner 120 may determine a shape of a plurality of sub coding units divided from the maximum coding unit, wherein the sub coding units have different sizes according to the depths of sub coding units. The image data encoder 130 outputs a bitstream by encoding the maximum coding unit based on the division shapes determined by the encoding depth determiner 120.

The encoding information encoder 140 encodes information about an encoding mode of the maximum coding unit determined by the encoding depth determiner 120. In other words, the encoding information encoder 140 outputs a bitstream by encoding information about a division shape of the maximum coding unit, information about the maximum depth, and information about an encoding mode of a sub coding unit for each depth. The information about the encoding mode of the sub coding unit may include information about a prediction unit of the sub coding unit, information about a prediction mode for each prediction unit, and information about a transform unit of the sub coding unit.

The information about the division shape of the maximum coding unit may be flag information, indicating whether each coding unit is divided. For example, when the maximum coding unit is divided and encoded, information indicating whether the maximum coding unit is divided is encoded. Also, when a sub coding unit divided from the maximum coding unit is divided and encoded, information indicating whether the sub coding unit is divided is encoded.

Since sub coding units having different sizes exist for each maximum coding unit and information about an encoding mode is determined for each sub coding unit, information about at least one encoding mode may be determined for one maximum coding unit.

The image encoding apparatus 100 may generate sub coding units by equally dividing the height and width of a maximum coding unit by two according to an increase of depth. That is, when the size of a coding unit of a kth depth is 2N×2N, the size of a coding unit of a (k+1)th depth is N×N.

Accordingly, the image encoding apparatus 100 may determine an optimal division shape for each maximum coding unit based on sizes of maximum coding units and a maximum depth in consideration of image characteristics. By variably adjusting the size of a maximum coding unit in consideration of image characteristics and encoding an image through division of a maximum coding unit into sub coding units of different depths, images having various resolutions may be more efficiently encoded.

Figure 2:
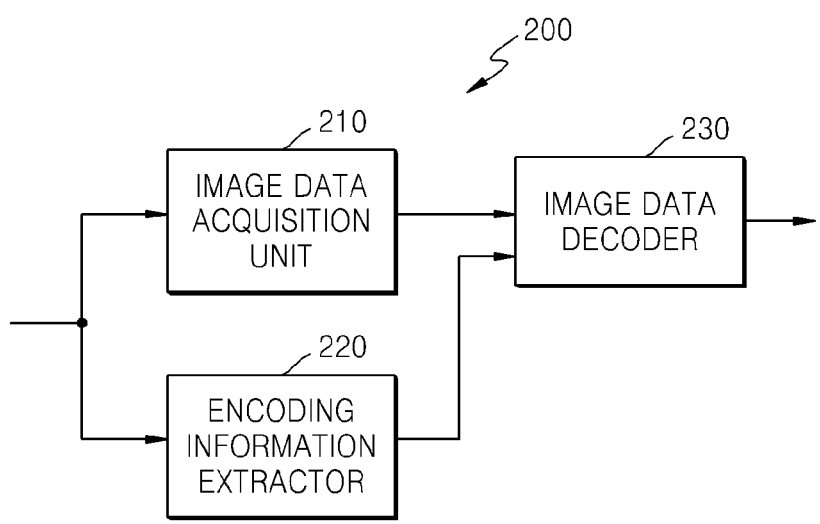
FIG. 2 is a block diagram of an apparatus for decoding an image, according to an exemplary embodiment.

FIG. 2 is a block diagram of an image decoding apparatus 200 for decoding an image according to an exemplary embodiment. The image decoding apparatus 200 may be implemented as a hardware apparatus such as, for example, a processor of a computer, or a computer system. The image decoding apparatus 200 may be also implemented as a software module residing on the computer system.

Referring to FIG. 2, the image decoding apparatus 200 includes an image data acquisition unit 210, an encoding information extractor 220, and an image data decoder 230 which may be implemented, for example, as hardware or software modules integrated within the image decoding apparatus 200 or separately from the image encoding apparatus 200.

The image data acquisition unit 210 acquires image data according to maximum coding units by parsing a bitstream received by the image decoding apparatus 200 and outputs the image data to the image data decoder 230. The image data acquisition unit 210 may extract information about a maximum coding unit of a current frame or slice from a header of the current frame or slice. In other words, the image data acquisition unit 210 divides the bitstream in the maximum coding unit so that the image data decoder 230 may decode the image data according to maximum coding units.

The encoding information extractor 220 extracts information about a maximum coding unit, a maximum depth, a division shape of the maximum coding unit, an encoding mode of sub coding units from the header of the current frame by parsing the bitstream received by the image decoding apparatus 200. The information about a division shape and the information about an encoding mode are provided to the image data decoder 230.

The information about a division shape of the maximum coding unit may include information about sub coding units having different sizes according to depths and included in the maximum coding unit, and may be flag information indicating whether each coding unit is divided.

The information about an encoding mode may include information about a prediction unit according to sub coding units, information about a prediction mode, and information about a transform unit.

The image data decoder 230 restores the current frame by decoding image data of every maximum coding unit based on the information extracted by the encoding information extractor 220.

The image data decoder 230 may decode sub coding units included in a maximum coding unit based on the information about a division shape of the maximum coding unit. A decoding process may include a prediction process including intra prediction and motion compensation and an inverse transform process.

The image data decoder 230 may perform intra prediction or inter prediction based on information about a prediction unit and information about a prediction mode to predict a prediction unit. The image data decoder 230 may also perform inverse transform for each sub coding unit based on information about a transform unit of a sub coding unit.

Figure 3:
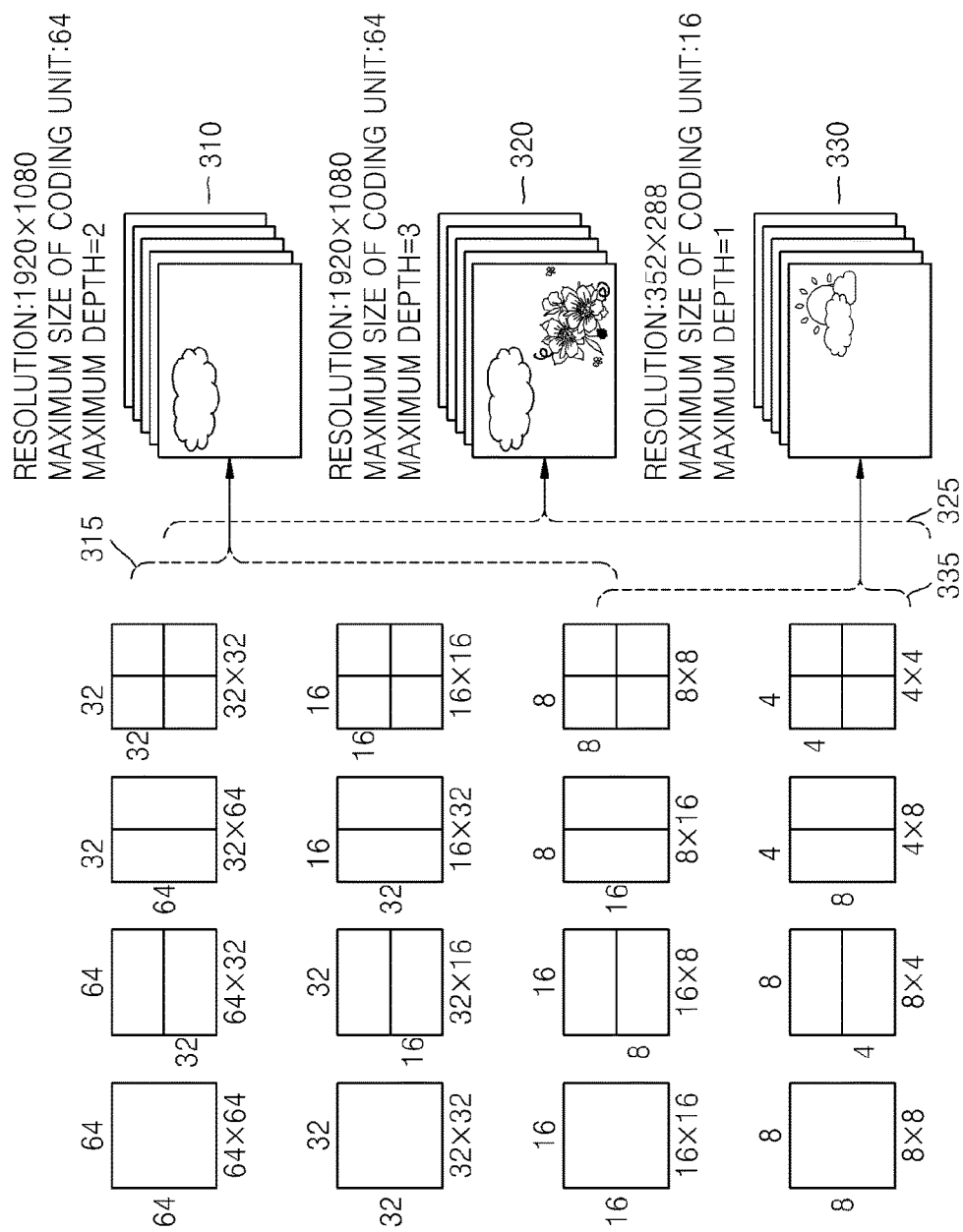
FIG. 3 illustrates hierarchical coding units according to an exemplary embodiment.

FIG. 3 illustrates hierarchical coding units according to an exemplary embodiment.

Referring to FIG. 3, the hierarchical coding units may include coding units whose widths and heights are 64×64, 32×32, 16×16, 8×8, and 4×4. Besides these coding units having perfect square shapes, coding units whose widths and heights are 64×32, 32×64, 32×16, 16×32, 16×8, 8×16, 8×4, and 4×8 may also exist.

Referring to FIG. 3, for image data set 310 whose resolution is 1920×1080, the size of a maximum coding unit is set to 64×64, and a maximum depth is set to 2.

For image data set 320 whose resolution is 1920×1080, the size of a maximum coding unit is set to 64×64, and a maximum depth is set to 3. For image data set 330 whose resolution is 352×288, the size of a maximum coding unit is set to 16×16, and a maximum depth is set to 1.

When the resolution is high or the amount of data is great, a maximum size of a coding unit may be set relatively great to increase a compression ratio and reflect image characteristics more precisely.

Accordingly, for the image data sets 310 and 320 having higher resolution than the image data set 330, 64×64 may be selected as the size of a maximum coding unit.

A maximum depth indicates the total number of layers in the hierarchical coding units. Since the maximum depth of the image data set 310 is 2, a coding unit 315 of the image data set 310 may include a maximum coding unit whose longer axis size is 64 and sub coding units whose longer axis sizes are 32 and 16, according to an increase of a depth.

On the other hand, since the maximum depth of the image data set 330 is 1, a coding unit 335 of the image data set 330 may include a maximum coding unit whose longer axis size is 16 and coding units whose longer axis sizes is 8, according to an increase of a depth.

However, since the maximum depth of the image data 320 is 3, a coding unit 325 of the image data set 320 may include a maximum coding unit whose longer axis size is 64 and sub coding units whose longer axis sizes are 32, 16, 8 and 4 according to an increase of a depth. Since an image is encoded based on a smaller sub coding unit as a depth increases, exemplary embodiments are suitable for encoding an image including more minute scenes.

Figure 4:
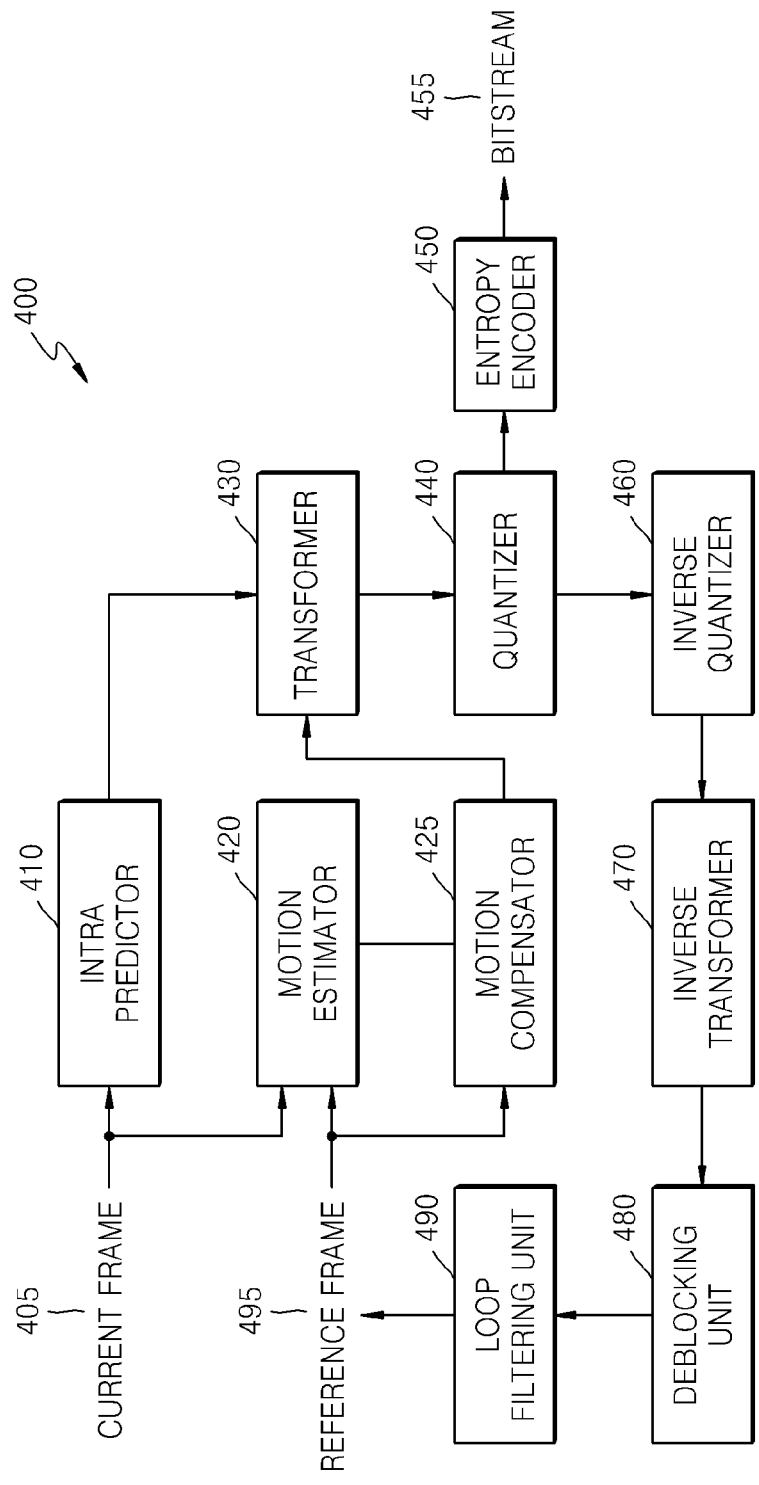
FIG. 4 is a block diagram of an image encoder based on a coding unit, according to an exemplary embodiment.

FIG. 4 is a block diagram of an image encoder 400 based on a coding unit, according to an exemplary embodiment. The image encoder 400 may be implemented as a hardware device such as, for example, a processor of a computer or as a software module residing on the computer system.

An intra predictor 410 performs intra prediction on prediction units of the intra mode in a current frame 405, and a motion estimator 420 and a motion compensator 425 perform inter prediction and motion compensation on prediction units of the inter mode using the current frame 405 and a reference frame 495. The intra predictor 410, the motion estimator 420, the motion compensator 425, and the reference frame 495 may be implemented, for example, as hardware or software modules integrated within the image encoder 400 or separately from the image encoder 400.

Residual values are generated based on the prediction units output from the intra predictor 410, the motion estimator 420, and the motion compensator 425. The generated residual values are output as quantized transform coefficients by passing through a transformer 430 and a quantizer 440.

The quantized transform coefficients are restored to residual values by passing through an inverse quantizer 460 and an inverse transformer 470, and the restored residual values are post-processed by passing through a deblocking unit 480 and a loop filtering unit 490 and output as the reference frame 495. The quantized transform coefficients may be output as a bitstream 455 by passing through an entropy encoder 450.

To perform encoding based on an encoding method according to an exemplary embodiment, the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 of the image encoder 400 perform image encoding processes based on a maximum coding unit, a sub coding unit according to depths, a prediction unit, and a transform unit.

Figure 5:
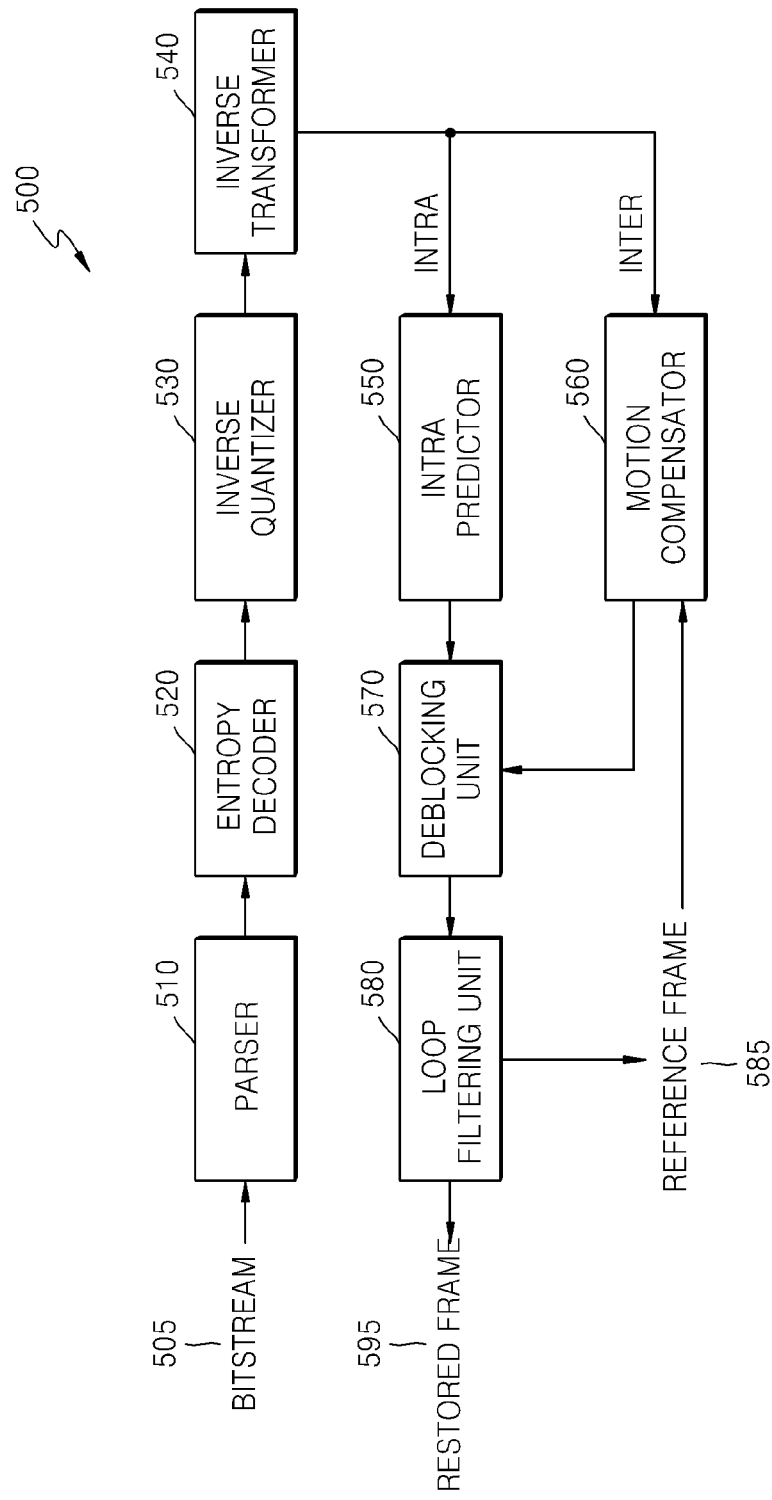
FIG. 5 is a block diagram of an image decoder based on a coding unit, according to an exemplary embodiment.

FIG. 5 is a block diagram of an image decoder 500 based on a coding unit, according to an exemplary embodiment. The image decoder 500 may be implemented as a hardware device such as, for example, a processor of a computer or as a software module residing on the computer system.

A bitstream 505 passes through a parser 510 so that the encoded image data to be decoded and encoding information necessary for decoding are parsed. The encoded image data is output as inverse-quantized data by passing through an entropy decoder 520 and an inverse quantizer 530 and restored to residual values by passing through an inverse transformer 540. The residual values are restored according to coding units by being added to an intra prediction result of an intra predictor 550 or a motion compensation result of a motion compensator 560. The restored coding units 585, 595 are used for prediction of next coding units or a next frame by passing through a deblocking unit 570 and a loop filtering unit 580. The parser 510, the entropy decoder 520, the inverse quantizer 530, the inverse transformer 540, the intra predictor 550, the compensator 560, the deblocking unit 570, and the loop filtering unit 580 may be implemented, for example, as hardware or software modules integrated within the image decoder 500 or separately from the image decoder 500.

To perform decoding based on a decoding method according to an exemplary embodiment, the parser 510, the entropy decoder 520, the inverse quantizer 530, the inverse transformer 540, the intra predictor 550, the motion compensator 560, the deblocking unit 570, and the loop filtering unit 580 of the image decoder 500 perform image decoding processes based on a maximum coding unit, a sub coding unit according to depths, a prediction unit, and a transform unit.

In particular, the intra predictor 550 and the motion compensator 560 determine a prediction unit and a prediction mode in a sub coding unit by considering a maximum coding unit and a depth, and the inverse transformer 540 performs inverse transform by considering the size of a transform unit.

Figure 6:
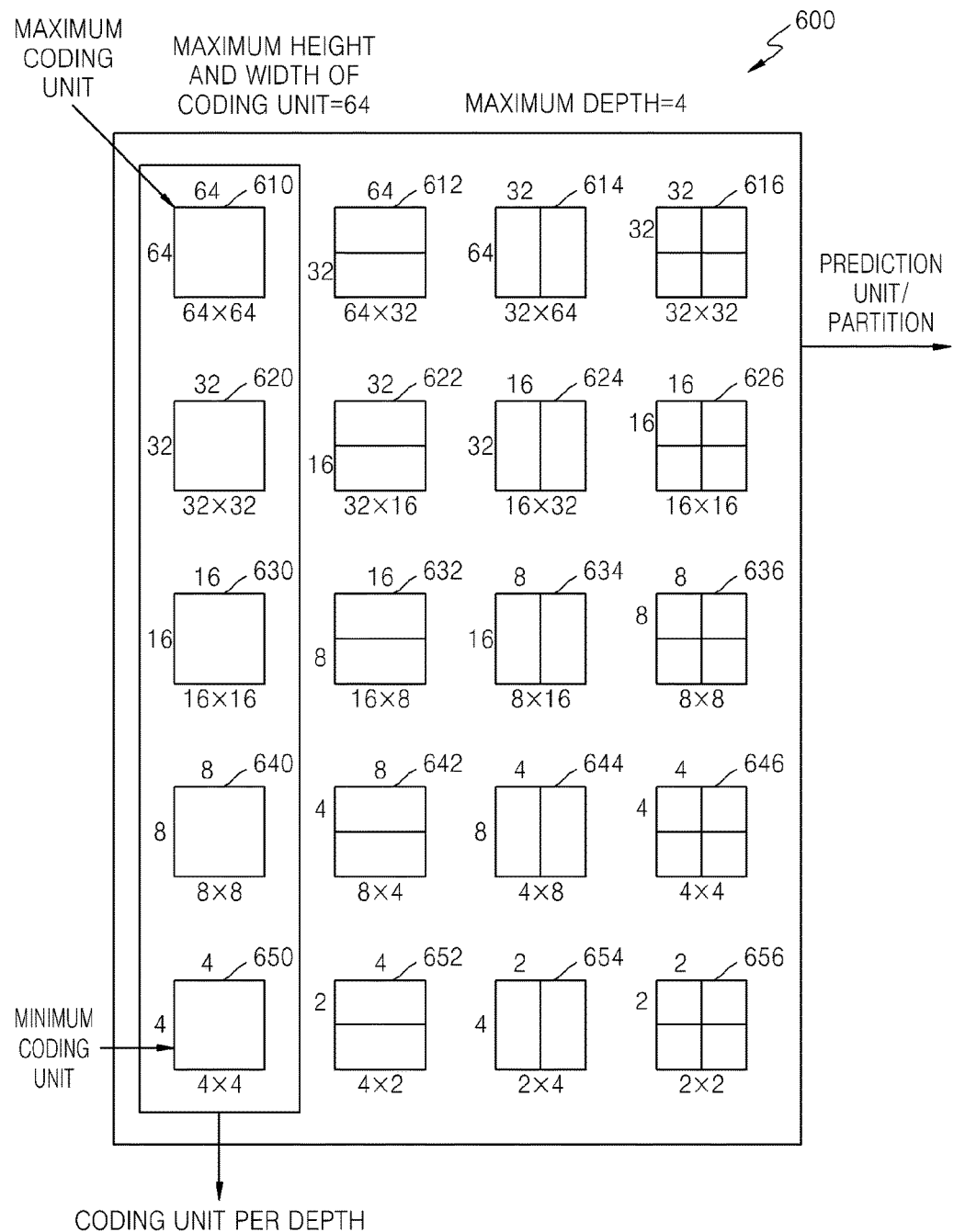
FIG. 6 illustrates a maximum coding unit, a sub coding unit, and a prediction unit, according to an exemplary embodiment.

FIG. 6 illustrates a maximum coding unit, a sub coding unit, and a prediction unit, according to an exemplary embodiment.

The image encoding apparatus 100 illustrated in FIG. 1 and the image decoding apparatus 200 illustrated in FIG. 2 use hierarchical coding units to perform encoding and decoding in consideration of image characteristics. A maximum coding unit and a maximum depth may be adaptively set according to the image characteristics or variously set according to requirements of a user.

In FIG. 6, a hierarchical coding unit structure 600 has a maximum encoding unit 610 which is a maximum coding unit whose height and width are 64 and maximum depth is 4. A depth increases along a vertical axis of the hierarchical coding unit structure 600, and as a depth increases, heights and widths of sub coding units 620 to 650 decrease. Prediction units of the maximum encoding unit 610 and the sub coding units 620 to 650 are shown along a horizontal axis of the hierarchical coding unit structure 600.

The maximum encoding unit 610 has a depth of 0 and the size of an coding unit, or a height and a width, of 64×64. A depth increases along the vertical axis, and there exist a first sub coding unit 620 whose size is 32×32 and depth is 1, a second sub coding unit 630 whose size is 16×16 and depth is 2, a third sub coding unit 640 whose size is 8×8 and depth is 3, and a minimum encoding unit 650 whose size is 4×4 and depth is 4. The minimum encoding unit 650 whose size is 4×4 and depth is 4 is a minimum coding unit, and the minimum coding unit may be divided into prediction units, each of which is a size smaller than the minimum coding unit.

Referring to FIG. 6, examples of prediction units are shown along the horizontal axis according to each depth. That is, a prediction unit of the maximum encoding unit 610 whose depth is 0 may be a prediction unit whose size is equal to the size 64×64 of the maximum coding unit, or a prediction unit 612 whose size is 64×32, a prediction unit 614 whose size is 32×64, or a prediction unit 616 whose size is 32×32, which has a size smaller than that of the maximum coding unit whose size is 64×64.

A prediction unit of the first sub coding unit 620 whose depth is 1 and size is 32×32 may be a prediction unit whose size is equal to the size 32×32 of the first sub coding unit, or a prediction unit 622 whose size is 32×16, a prediction unit 624 whose size is 16×32, or a prediction unit 626 whose size is 16×16, which has a size smaller than that of the first sub coding unit 620 whose size is 32×32.

A prediction unit of the second sub coding unit 630 whose depth is 2 and size is 16×16 may be a prediction unit whose size is equal to the size 16×16 of the second sub coding unit 630, or a prediction unit 632 whose size is 16×8, a prediction unit 634 whose size is 8×16, or a prediction unit 636 whose size is 8×8, which has a size smaller than that of the second sub coding unit 630 whose size is 16×16.

A prediction unit of the third sub coding unit 640 whose depth is 3 and size is 8×8 may be a prediction unit whose size is equal to the size 8×8 of the third sub coding unit 640 or a prediction unit 642 whose size is 8×4, a prediction unit 644 whose size is 4×8, or a prediction unit 646 whose size is 4×4, which has a size smaller than that of the third sub coding unit 640 whose size is 8×8.

The minimum encoding unit 650 whose depth is 4 and size is 4×4 is a minimum coding unit and a coding unit of a maximum depth. A prediction unit of the minimum encoding unit 650 may be a prediction unit 650 whose size is 4×4, a prediction unit 652 having a size of 4×2, a prediction unit 654 having a size of 2×4, or a prediction unit 656 having a size of 2×2.

Figure 7:
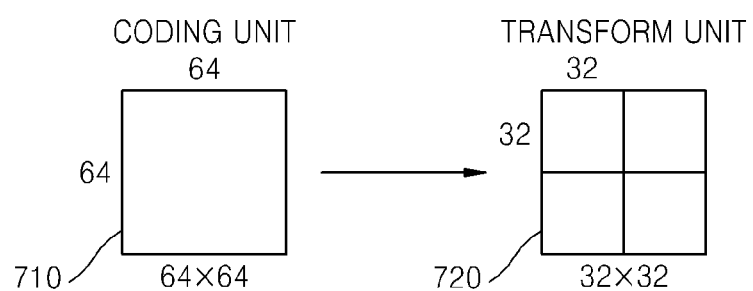
FIG. 7 illustrates a coding unit and a transform unit, according to an exemplary embodiment.

FIG. 7 illustrates a coding unit and a transform unit, according to an exemplary embodiment.

The image encoding apparatus 100 illustrated in FIG. 1 and the image decoding apparatus 200 illustrated in FIG. 2 perform encoding and decoding with a maximum coding unit or with sub coding units, which have size equal to or smaller than the maximum coding unit, divided from the maximum coding unit. In the encoding and decoding process, the size of a transform unit for frequency transform is selected to be no larger than that of a corresponding coding unit. For example, if a current coding unit 710 has the size of 64×64, frequency transform may be performed using a transform unit 720 having the size of 32×32.

FIGS. 8A, 8B, 8C, and 8D illustrate division shapes of a coding unit, a prediction unit, and a transform unit, according to an exemplary embodiment.

Figure 8A:
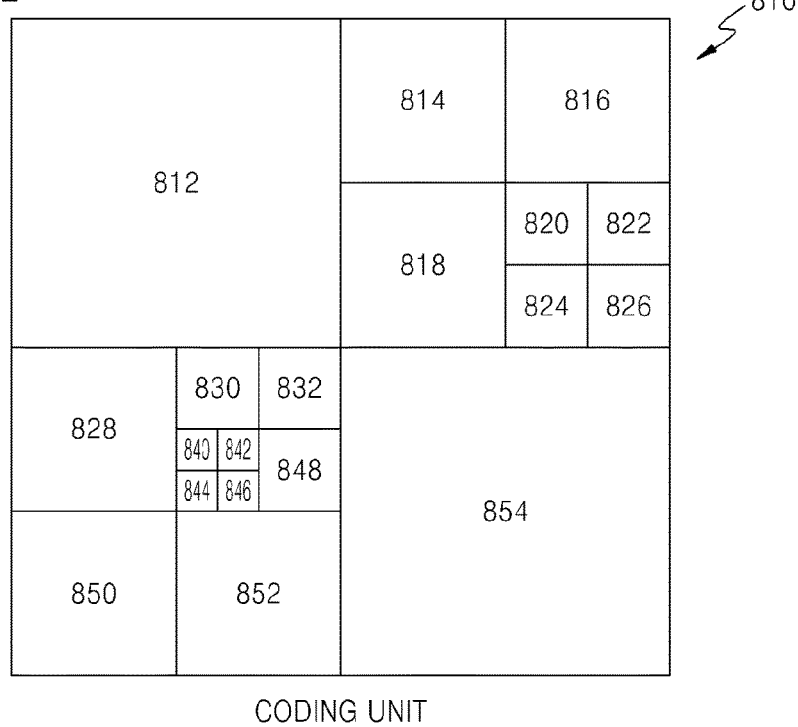
FIGS. 8A, 8B, 8C, and 8D illustrate division shapes of a coding unit, a prediction unit, and a transform unit, according to an exemplary embodiment.
Figure 8B:
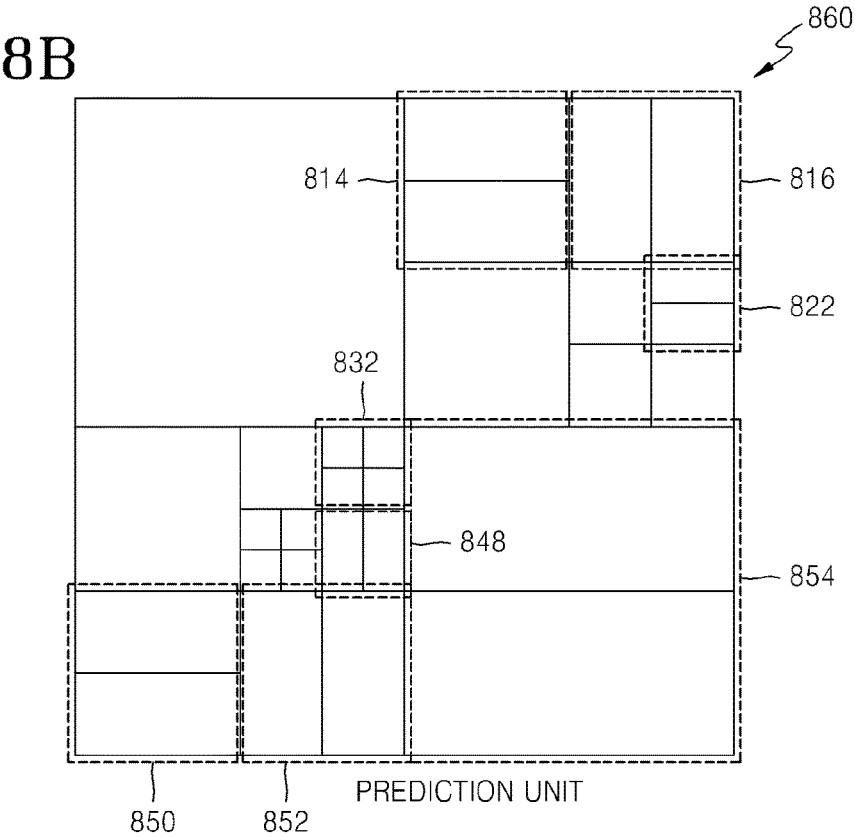

FIGS. 8A and 8B respectively illustrate a coding unit and a prediction unit, according to an exemplary embodiment.

FIG. 8A shows a division shape selected by the image encoding apparatus 100 illustrated in FIG. 1, to encode a maximum coding unit 810. The image encoding apparatus 100 divides the maximum coding unit 810 into various shapes, performs encoding, and selects an optimal division shape by comparing encoding results of various division shapes with each other based on the RD costs. When it is optimal that the maximum coding unit 810 to be encoded, the maximum coding unit 810 may be encoded without dividing the maximum coding unit 810, as illustrated in FIGS. 8A through 8D.

Referring to FIG. 8A, the maximum coding unit 810 whose depth is 0 is encoded by dividing the maximum encoding unit 810 into sub coding units 812, 854 whose depths are equal to or greater than 1. That is, the maximum coding unit 810 is divided into 4 sub coding units whose depths are 1, and all or some of the sub coding units whose depths are 1 are divided into sub coding units 814, 816, 818, 828, 850, and 852 whose depths are 2.

A sub coding unit located in an upper-right side and a sub coding unit located in a lower-left side among the sub coding units whose depths are 1 are divided into sub coding units whose depths are equal to or greater than 2. Some of the sub coding units whose depths are equal to or greater than 2 may be further divided into sub coding units 820, 822, 824, 826, 830, 832, 840, 842, 844, 846, and 848 whose depths are equal to or greater than 3.

FIG. 8B shows a division shape of a prediction unit for the maximum coding unit 810.

Referring to FIG. 8B, a prediction unit 860 for the maximum coding unit 810 may be divided differently from the maximum coding unit 810. In other words, a prediction unit for each of sub coding units may be smaller than a corresponding sub coding unit.

For example, a prediction unit for a sub coding unit 854 located in a lower-right side among the sub coding units 812, 854 whose depths are 1 may be smaller than the sub coding unit 854. In addition, prediction units for sub coding units 814, 816, 850, and 852 of sub coding units 814, 816, 818, 828, 850, and 852 whose depths are 2 may be smaller than the sub coding units 814, 816, 850, and 852, respectively.

In addition, prediction units for sub coding units 822, 832, and 848 whose depths are 3 may be smaller than the sub coding units 822, 832, and 848, respectively. The prediction units may have a shape whereby respective sub coding units are equally divided by two in a direction of height or width or have a shape whereby respective sub coding units are equally divided by four in directions of height and width.

Figure 8C:
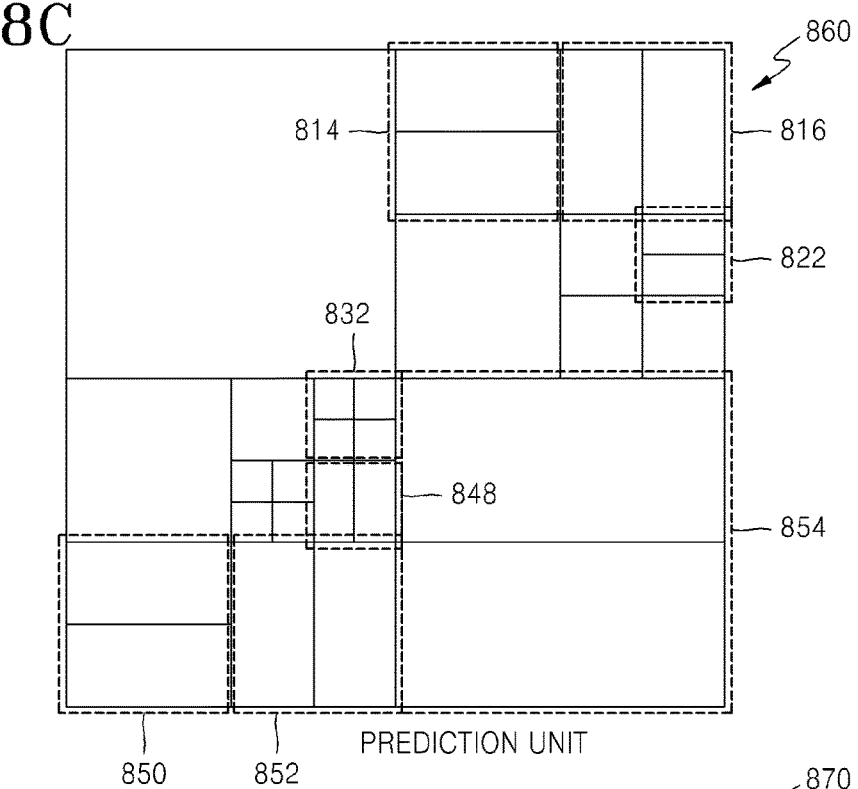
Figure 8D:
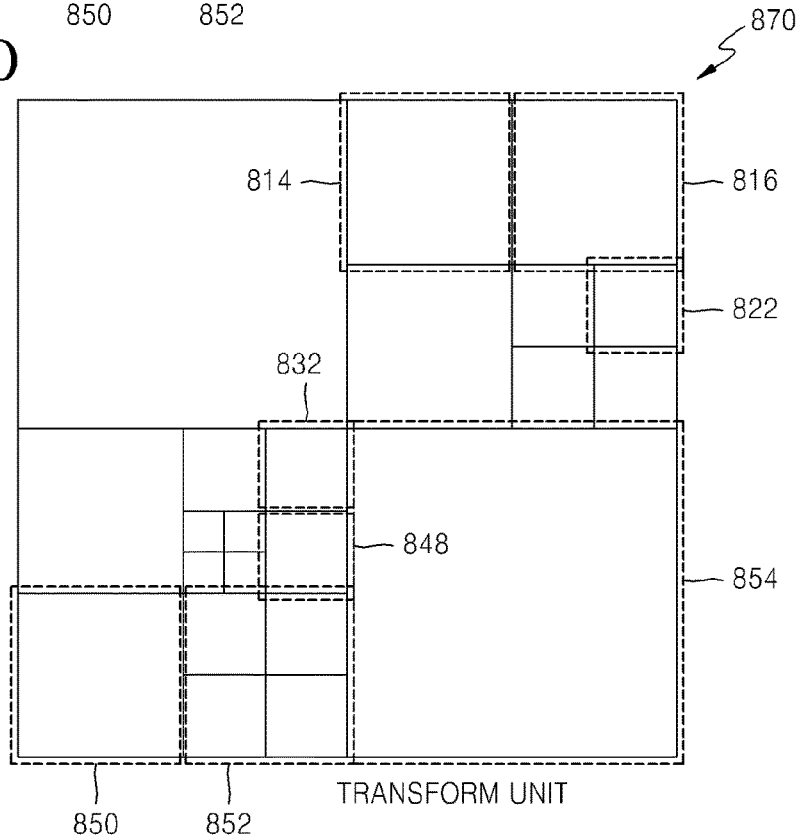

FIGS. 8C and 8D illustrate a prediction unit and a transform unit, according to an exemplary embodiment.

FIG. 8C shows a division shape of a prediction unit for the maximum coding unit 810 shown in FIG. 8B, and FIG. 8D shows a division shape of a transform unit of the maximum coding unit 810.

Referring to FIG. 8D, a division shape of a transform unit 870 may be set differently from the prediction unit 860.

For example, even though a prediction unit for the sub coding unit 854 whose depth is 1 is selected with a shape whereby the height of the sub coding unit 854 is equally divided by two, a transform unit may be selected with the original size of the sub coding unit 854. Likewise, even though prediction units for sub coding units 814 and 850 whose depths are 2 are selected with a shape whereby the height of each of the sub coding units 814 and 850 is equally divided by two, a transform unit may be selected with the same size as the original size of each of the sub coding units 814 and 850.

A transform unit may be selected with a smaller size than a prediction unit. For example, when a prediction unit for the sub coding unit 852 whose depth is 2 is selected with a shape whereby the width of the sub coding unit 852 is equally divided by two, a transform unit may be selected with a shape whereby the sub coding unit 852 is equally divided by four in directions of height and width, which has a smaller size than the shape of the prediction unit.

Alternatively, as will described with reference to FIGS. 13A through 13D, a transform unit may be set to have a larger size than a coding unit, regardless of the coding unit.

Figure 9:
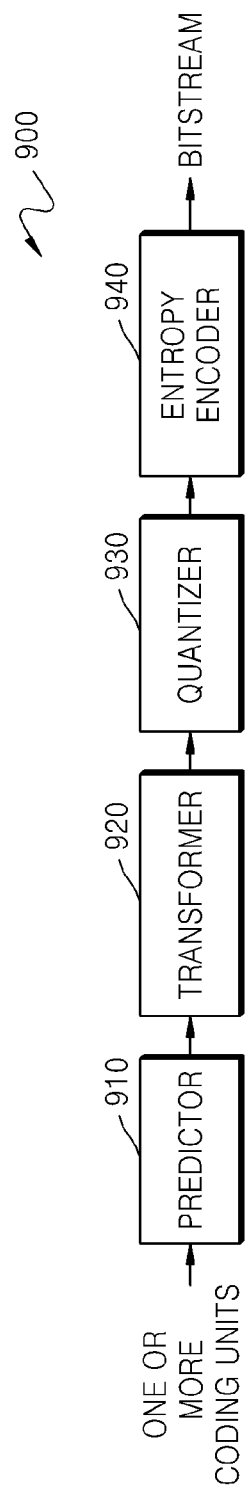
FIG. 9 is a block diagram of an apparatus for encoding an image, according to another exemplary embodiment.

FIG. 9 is a block diagram of an apparatus 900 for encoding an image, according to another exemplary embodiment.

Referring to FIG. 9, the image encoding apparatus 900 according to the current exemplary embodiment includes a predictor 910, a transformer 920, a quantizer 930, and an entropy encoder 940.

The predictor 910 generates residual values by performing intra prediction or inter prediction on one or more coding units. As will be described later, residual values included in a plurality of prediction units may be grouped into one transform unit and then transformed to a frequency domain, and thus the residual values are generated by predicting the one or more coding units based on the plurality of prediction units. The transform to the frequency domain may be DCT or KLT.

As described above with reference to FIG. 8A, in the image encoding method according to an exemplary embodiment, one coding unit may include a plurality of prediction units. Thus, the predictor 910 may predict each of the prediction units, and generate the residual values of the prediction units included in the one coding unit.

Alternatively, the prediction unit 910 may predict the plurality of coding units all at once. As will be described later, according to an exemplary embodiment, a plurality of prediction units included in a plurality of coding units may be grouped into one transform unit, and thus residual values are generated by predicting each of the prediction units included in the coding units. For example, all sub coding units included in one maximum coding unit may be predicted in order to generate the residual values of the coding units.

According to conventional technology, since transform (e.g. DCT or KLT) is performed with a size smaller than or equal to a prediction unit, a predetermined prediction unit is independently encoded, restored, and then used to predict a next prediction unit. However, according to a method of encoding an image, according to an exemplary embodiment, which will be described later, since transform is performed by grouping prediction units included in one or more coding units into one transform unit, a predetermined prediction unit cannot be independently encoded and restored. This will be described in detail with reference to FIG. 10.

Figure 10:
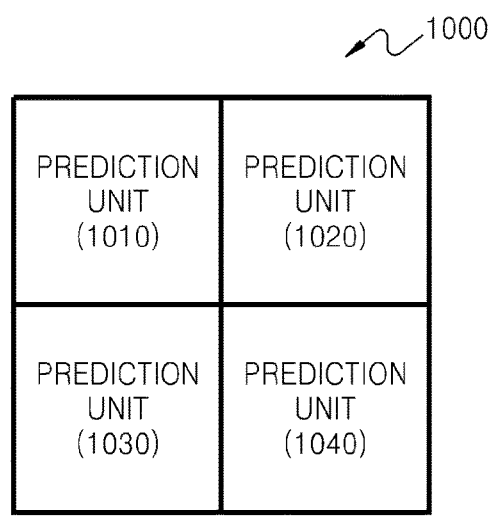
FIG. 10 is a diagram for describing a prediction method, according to an exemplary embodiment.

FIG. 10 is a diagram for describing a prediction method, according to an exemplary embodiment.

Referring to FIG. 10, one coding unit 1000 may include a plurality of prediction units 1010 through 1040. If transform is performed with a size smaller than or equal to a prediction unit, as in conventional technology, the prediction units 1010 through 1030 may be encoded and restored before encoding the prediction unit 1040 at a lower-right side.

Accordingly, if the prediction unit 1040 is to be predicted via intra prediction according to the conventional technology, the prediction unit 1040 is intra predicted by using pixels adjacent to the prediction unit 1040, from among pixels generated by encoding and then restoring the prediction units 1010 through 1030.

On the other hand, according to an exemplary embodiment, a plurality of prediction units are grouped into one transform unit, and then transform is performed. Here, if the prediction units 1010 through 1040 of FIG. 10 are grouped into one transform unit, the prediction unit 1040 at the lower-right side is encoded with the other prediction units 1010 through 1030, and thus the prediction units 1010 through 1030 are not encoded before encoding the prediction unit 1040. Accordingly, the prediction unit 1040 cannot be intra predicted by using the pixels generated by encoding and then restoring the prediction units 1010 through 1030.

Consequently, the prediction unit 910 of FIG. 9 may predict the prediction unit 1040 by using prediction values of the prediction units 1010 through 1030. The prediction unit 1040 at the lower-right side is predicted by using the prediction values of the prediction units 1010 through 1030, instead of the pixels generated by encoding and then restoring the prediction units 1010 through 1030.

In other words, if there is a first prediction unit predicted via intra prediction, from among prediction units grouped into one transform unit, the first prediction unit may be intra predicted by using prediction values of at least one adjacent prediction unit.

Alternatively, the prediction units grouped into one transform unit may all be predicted via inter prediction. As described with reference to FIG. 10, since a prediction unit that is predicted via intra prediction is at issue while grouping a plurality of prediction units into one transform unit, all prediction units grouped into the transform unit may be predicted by using only inter prediction.

Referring back to FIG. 9, the transformer 920 receives an image processing unit in a pixel domain, and transforms the image processing unit into a frequency domain. The transformer 920 transforms the residual values generated by the prediction unit 910 into the frequency domain.

As described above, the transformer 920 groups the prediction units into one transform unit, and performs DCT or KLT according to the transform unit. The residual values may be residual values of a plurality of prediction units included in one or more coding units. Coefficients of frequency components are generated as a result of transforming the pixel domain to the frequency domain.

According to an exemplary embodiment, the transform to the frequency domain may be performed via DCT or KLT, and discrete cosine coefficients are generated as a result of the DCT or KLT. However, any transform for transforming an image in a pixel domain to the frequency domain may be used.

Figure 11:
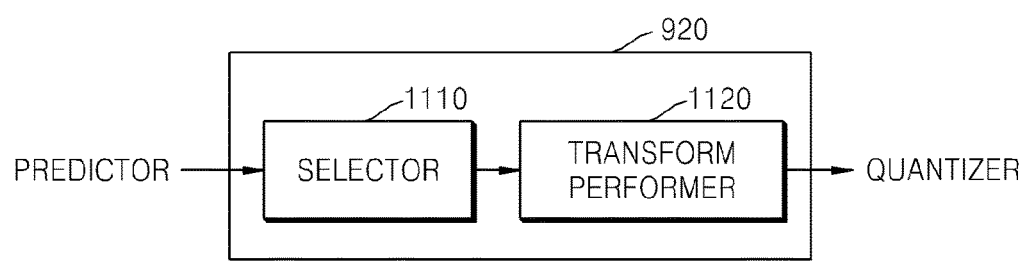
FIG. 11 is a block diagram of a transformer, according to an exemplary embodiment.

FIG. 11 is a block diagram of the transformer 920 according to an exemplary embodiment.

Referring to FIG. 11, the transformer 920 includes a selector 1110 and a transform performer 1120.

The selector 1110 sets one transform unit by selecting a plurality of adjacent prediction units. According to conventional image encoding apparatuses described above, intra prediction or inter prediction is performed according to a predetermined prediction unit and DCT or KLT is performed with a size smaller than or equal to the predetermined prediction unit. In other words, the conventional image encoding apparatuses perform DCT or KLT based on a transform unit having a size smaller than or equal to a prediction unit.

However, a compression ratio of image encoding is deteriorated since an added overhead increases as a size of a transform unit is decreased due to header information added for each transform unit. Accordingly, the image encoding apparatus 900 according to the current exemplary embodiment groups the adjacent prediction units into one transform unit, and then performs DCT or KLT according to the transform unit. Specifically, since it is highly likely that the adjacent prediction units have similar residual values, a compression ratio of encoding may be remarkably increased when DCT or KLT is performed according to the transform unit generated by grouping the adjacent prediction units.

Accordingly, the selector 1110 selects the prediction units to be grouped into one transform unit and on which DCT or KLT is to be performed. The prediction units may be adjacent to each other. This will be described in detail with reference to FIGS. 12A through 12C and 13A through 13D.

Figure 12A:
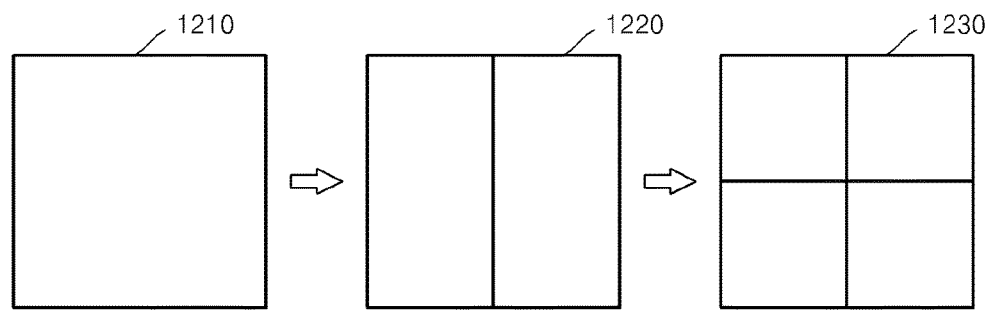
FIGS. 12A through 12C are diagrams of types of transform units, according to exemplary embodiments.
Figure 12B:
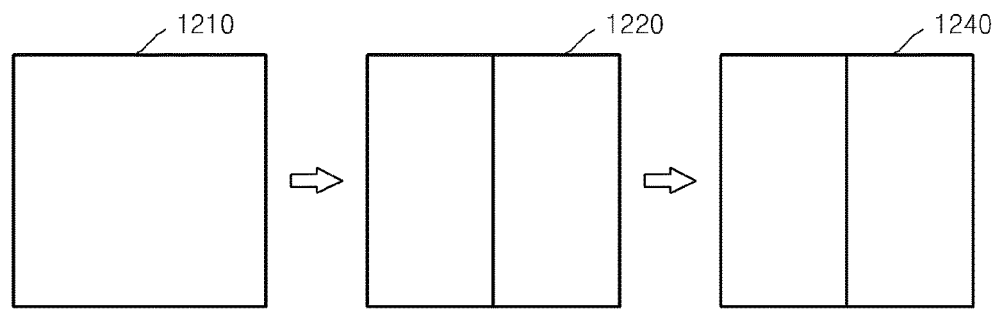
Figure 12C:
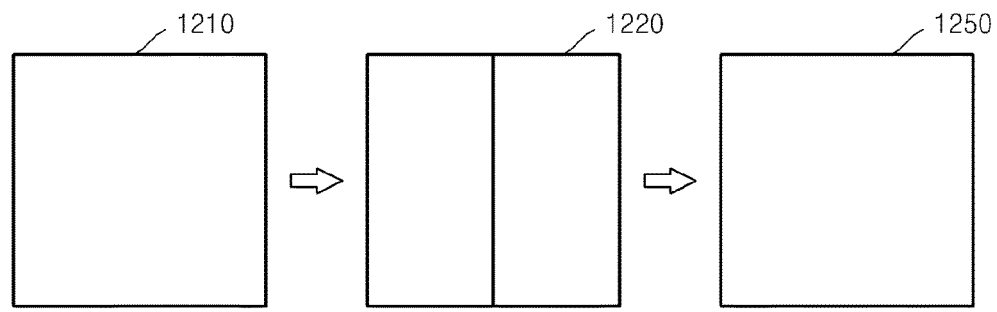

FIGS. 12A through 12C are diagrams of types of transform units 1230 through 1250, according to exemplary embodiments.

Referring to FIGS. 12A through 12C, a prediction unit 1220 may have a shape whereby a coding unit 1210 is equally divided by two in a direction of width. The coding unit 1210 may be a maximum coding unit as described above, or a sub coding unit having a smaller size than the maximum coding unit.

Even when the coding unit 1210 and the prediction unit 1220 are identical, the transform units 1230 through 1250 may be different. A size of the transform unit 1230 may be smaller than that of the prediction unit 1220 as shown in FIG. 12A, or a size of the transform unit 1240 may be identical to that of the prediction unit 1220 as shown in FIG. 12B. Alternatively, a size of the transform unit 1250 may be larger than that of the prediction unit 1220 as shown in FIG. 12C.

The prediction units grouped into one transform unit may be a plurality of prediction units included in one coding unit as shown in FIGS. 12A through 12C, or may be a plurality of prediction units included in different coding units. In other words, a plurality of prediction units included in at least one coding unit may be grouped into one transform unit and then transformed to the frequency domain.

FIGS. 13A through 13D are diagrams of types of transform units according to exemplary embodiments.

Figure 13A:
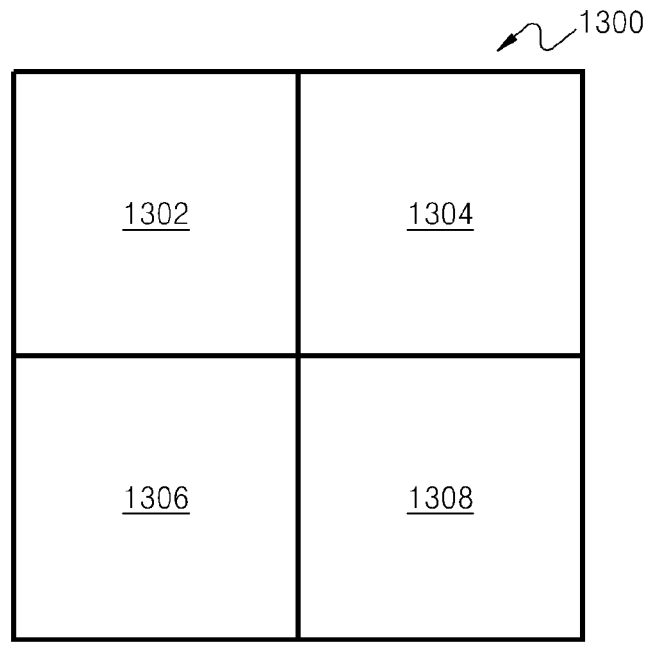
FIGS. 13A through 13D are diagrams of types of transform units, according to other exemplary embodiments.
Figure 13B:
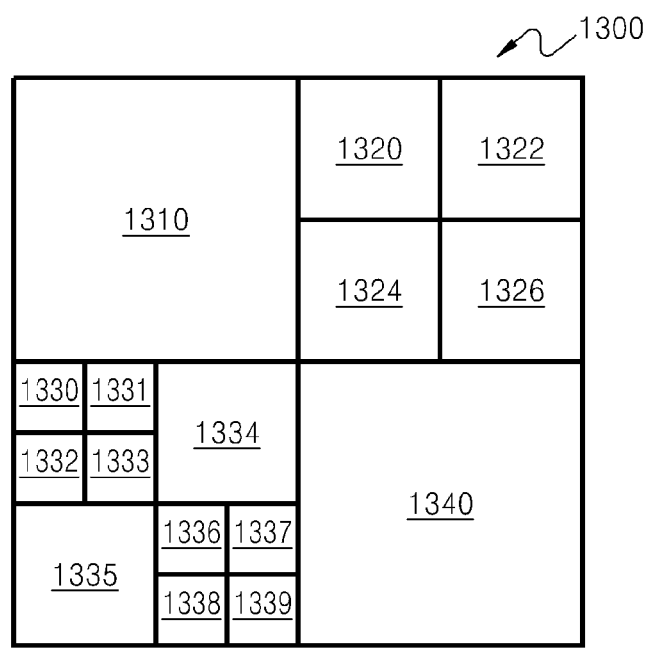

One maximum coding unit 1300 may be divided into sub coding units 1302 through 1308 having different sizes and then encoded as shown in FIG. 13A, and each of the sub coding units 1302 through 1308 may include at least one prediction unit 1310 through 1340, as shown in FIG. 13B.

Figure 13C:
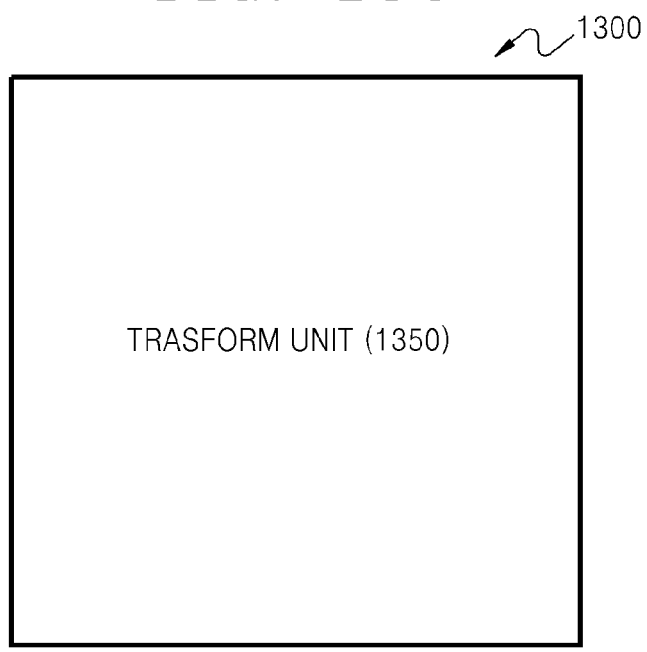

The selector 1110 may group the prediction units 1310 through 1340 shown in FIG. 13B into one transform unit 1350 shown in FIG. 13C, and then transform the transform unit 1350 into the frequency domain.

Figure 13D:
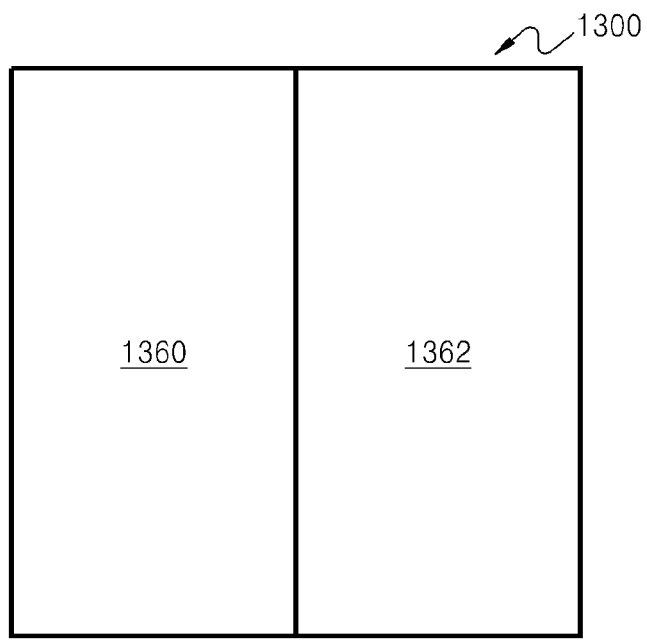

Alternatively, the selector 1110 may group the prediction units 1310 and 1330 through 1339 of the sub coding units 1302 and 1306 on the left into one transform unit 1360, and group the prediction units 1320 through 1328 and 1340 of the sub coding units 1304 and 1308 on the right into one transform unit 1362, as shown in FIG. 13D.

Referring back to FIG. 11, a criterion for the selector 1110 to select a plurality of adjacent prediction units is not limited. However, according to an exemplary embodiment, the selector 1110 may select a transform unit based on a depth. As described above, the depth indicates a degree of hierarchically decreasing a coding unit from a maximum coding unit of a current slice or frame to sub coding units. As described above with reference to FIGS. 3 and 6, as a depth increases, a size of a sub coding unit decreases, and thus a size of a prediction unit included in the sub coding unit decreases. Here, when DCT or KLT is performed according to a transform unit having a size smaller than or equal to a prediction unit, a compression ratio of image encoding is decreased because header information is added for each transform unit as described above.

Accordingly, prediction units included in a sub coding unit whose depth is equal to or above a predetermined value may be grouped into one transform unit, and then DCT or KLT may be performed on the transform unit. Thus, the selector 1110 may set the transform unit based on the depth of the sub coding unit. For example, when a depth of the coding unit 1210 of FIG. 12C is higher than k, the selector 1110 groups the prediction units 1220 into one transform unit 1250.

Alternatively, when a maximum coding unit includes a plurality of sub coding units whose depths are equal to or above a predetermined value, the selector 1110 may group prediction units of the sub coding units into one transform unit. FIG. 13C illustrates an example of grouping prediction units of sub coding units whose depth is larger than a maximum coding unit, i.e., whose depth is larger than 1, into one transform unit.

According to another exemplary embodiment, the selector 1110 may set a plurality of adjacent prediction units, on which prediction is performed according to a same type of prediction mode, into one transform unit. The adjacent prediction units that are predicted by using intra prediction or inter prediction are grouped into one transform unit. Since it is highly likely that the adjacent prediction units that are predicted according to the same type of prediction mode have similar residual values, DCT or KLT may be performed by grouping the adjacent prediction units into one transform unit.

When the selector 1110 sets the transform unit, the transform performer 1120 transforms the adjacent prediction units into a frequency domain according to the set transform unit. Coefficients of frequency domain (e.g. discrete cosine coefficients) are generated by transforming the selected prediction units into one transform unit.

Referring back to FIG. 9, the quantizer 930 quantizes the frequency component coefficients generated by the transformer 920. The quantizer 930 may quantize the coefficients input according to a predetermined quantization process.

The entropy encoder 940 entropy-encodes the coefficients quantized by the quantizer 930. Here, the discrete cosine coefficients may be entropy-encoded by using context-adaptive binary arithmetic coding (CABAC) or context-adaptive variable length coding (CAVLC).

The image encoding apparatus 900 may encode flag information indicating whether the transform unit generated by grouping the prediction units includes the coefficients. If there are no coefficients to be entropy-encoded, i.e., when the quantized coefficients are all '0', flag information indicating that the transform unit does not include the coefficients is encoded, and the quantized coefficients are not separately entropy-encoded.

The image encoding apparatus 900 according to the current exemplary embodiment may determine an optimum transform unit by repeatedly performing transform, quantization, and entropy encoding on different transform units. The optimum transform unit may be determined by mechanically repeating a process of selecting a plurality of prediction units by using various methods, instead of selecting the prediction units based on a predetermined criterion, such as a depth or a same type of prediction mode. The optimum transform unit may be determined based on calculation of RD costs, and this will be described in detail with reference to FIG. 14.

Figure 14:
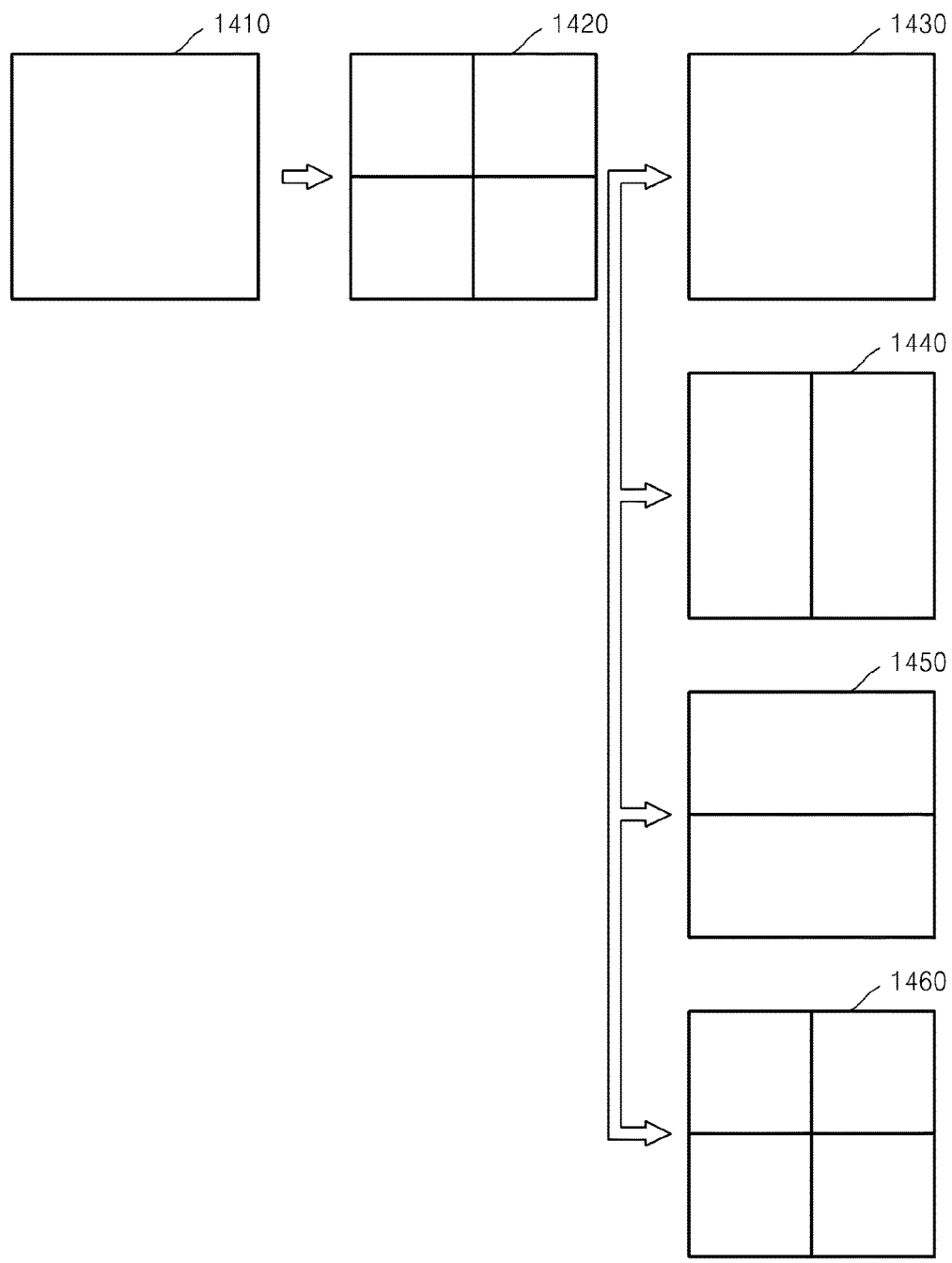
FIG. 14 is a diagram of different transform units, according to exemplary embodiments.

FIG. 14 is a diagram of different transform units 1430 through 1460 according to exemplary embodiments.

Referring to FIG. 14, the image encoding apparatus 900 repeatedly encodes different transform units 1430 through 1460.

As shown in FIG. 14, a coding unit 1410 may be predicted and encoded based on a prediction unit 1420 having a size smaller than the coding unit 1410. DCT or KLT is performed on residual values generated as a result of prediction, and here, the DCT or KLT may be performed based on the different transform units 1430 through 1460 as shown in FIG. 14.

The transform unit 1430 has the same size as the coding unit 1410, and is generated by grouping all prediction units included in the coding unit 1410.

The transform units 1440 have a size whereby the coding unit 1410 is equally divided by two in a direction of width, and are generated by grouping the prediction units that are adjacent in a vertical direction.

The transform units 1450 have a size whereby the coding unit 1410 is equally divided by two in a direction of height, and are generated by grouping the prediction units that are adjacent in a horizontal direction.

The transform units 1460 have the same sizes as the prediction units 1420.

The image encoding apparatus 900 may determine the optimum transform unit by repeatedly performing transform, quantization, and entropy encoding on the transform units 1430 through 1460.

Alternatively, the image encoding apparatus 900 may encode flag information indicating whether the transform unit is generated by grouping a plurality of prediction units included in one or more coding units. For example, when a transform unit is set by grouping a plurality of prediction units included in one coding unit as shown in FIGS. 12A through 12C, flag information is set to '0', and when a transform unit is set by grouping a plurality of prediction units included in a plurality of coding units as shown in FIGS. 13A through 13D, flag information is set to '1'.

FIG. 14 illustrates an example of determining the optimum transform unit when one transform unit is set by grouping prediction units included in one coding unit. However, the optimum transform unit may be determined by repeatedly performing DCT, quantization, and entropy encoding on different transform units, as shown in FIG. 14, even when one transform unit is set by grouping prediction units included in a plurality of coding units.

Figure 15:
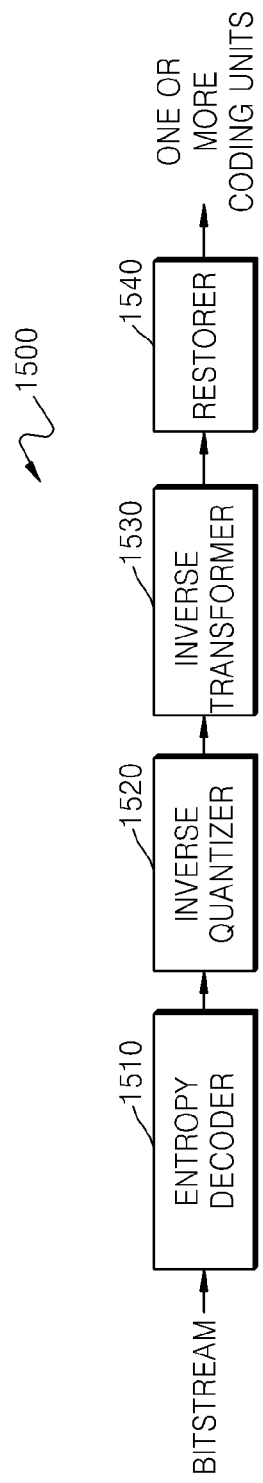
FIG. 15 is a block diagram of an apparatus for decoding an image, according to another exemplary embodiment.

FIG. 15 is a block diagram of an apparatus 1500 for decoding an image, according to another exemplary embodiment.

Referring to FIG. 15, the image decoding apparatus 1500 includes an entropy decoder 1510, an inverse quantizer 1520, an inverse transformer 1530, and a restorer 1540.

The entropy decoder 1510 entropy-decodes frequency component coefficients of a predetermined transform unit. As described above with reference to FIGS. 12A through 12C and 13A through 13D, the transform unit may be generated by grouping a plurality of prediction units. As described above, the prediction units may be adjacent to each other, and may be included in one coding unit or in a plurality of different coding units.

As described above with reference to the image encoding apparatus 900, the transform unit may be generated by grouping a plurality of adjacent prediction units based on a depth, or by grouping a plurality of adjacent prediction units on which prediction is performed according to a same type of prediction mode, i.e., according to an intra prediction mode or an inter prediction mode. Alternatively, as described with reference to FIG. 14, an optimum transform unit may be selected by repeatedly performing transform, quantization, and entropy decoding on different transform units by mechanically repeating a process of grouping a plurality of prediction units.

If a transform unit does not include coefficients (e.g. discrete cosine coefficients), the entropy decoder 1510 may not separately entropy-decode quantized coefficients. If the transform unit does not include the quantized coefficients, the quantized coefficients are not separately entropy-encoded by referring to predetermined flag information.

The inverse quantizer 1520 inverse-quantizes the frequency component coefficients that are entropy-decoded by the entropy decoder 1510. The frequency component coefficients that are entropy-decoded according to a quantization step used while encoding the transform unit are inverse-quantized.

The inverse transformer 1530 inverse-transforms the inverse-quantized frequency component coefficients into a pixel domain. Inverse DCT or inverse KLT is performed on the inverse-quantized discrete cosine coefficients to restore a transform unit in a pixel domain. As a result of inverse transform, residual values of the transform unit are restored.

The restored transform unit includes a plurality of prediction units, and as described above, the prediction units may be included in one coding unit or in a plurality of different coding units.

The restorer 1540 generates prediction values by predicting a plurality of prediction units included in the restored transform unit. Prediction values of one coding unit are generated if the prediction units grouped into one transform unit are included in one coding unit, and prediction values of a plurality of coding units are generated if the prediction units grouped into one transform unit are included in a plurality of coding units. One coding unit or a plurality of coding units is restored by adding the generated prediction values and the residual values restored by the inverse transformer 1530.

Whether the prediction values are generated for one coding unit or a plurality of coding units may be determined based on flag information indicating whether the image encoding apparatus 900 generated a transform unit by grouping a plurality of prediction units included in one coding unit or in a plurality of coding units.

According to one exemplary embodiment, if the prediction units grouped into one transform unit include a prediction unit that is intra-predicted, intra prediction may be performed based on prediction values of at least one adjacent prediction unit, as described with reference to FIG. 10. Alternatively, a plurality of prediction units grouped into one transform unit may all be predicted by using inter prediction.

Figure 16:
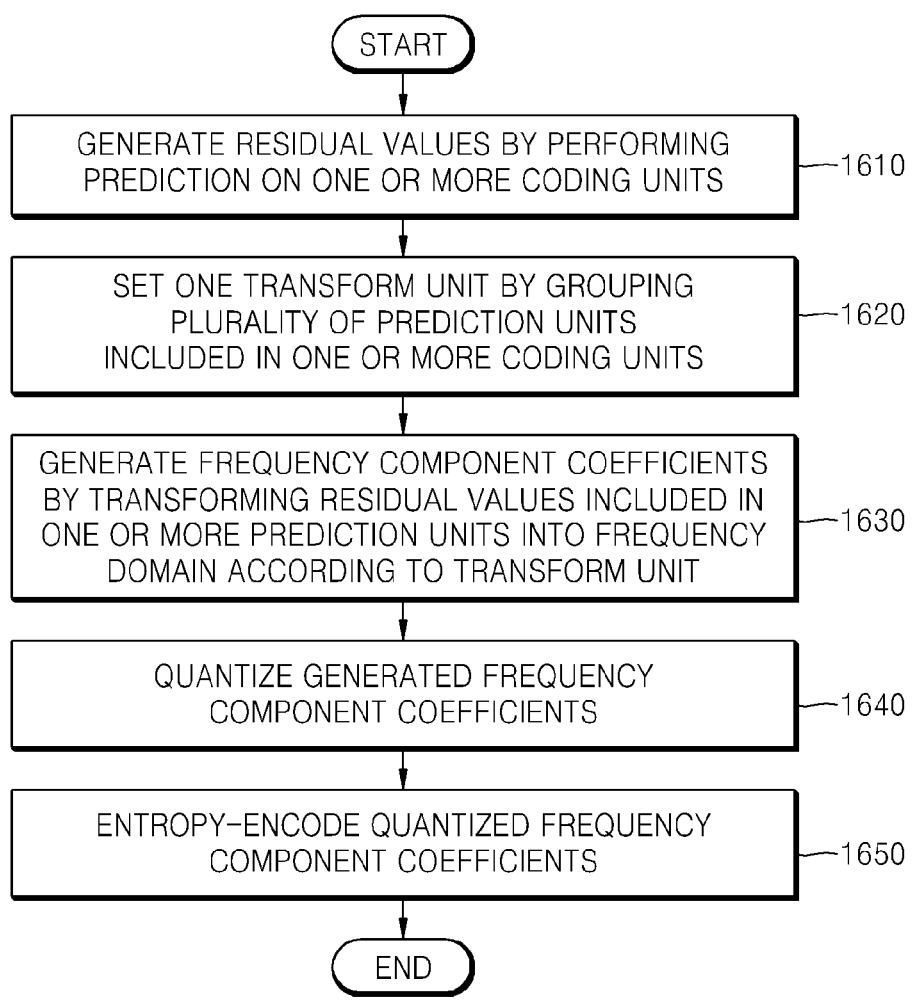
FIG. 16 is a flowchart illustrating a method of encoding an image, according to an exemplary embodiment.

FIG. 16 is a flowchart illustrating a method of encoding an image, according to an exemplary embodiment.

Referring to FIG. 16, an apparatus for encoding an image generates residual values by performing prediction on one or more coding units in operation 1610.

A plurality of prediction units grouped into one transform unit may be included in one coding unit or in a plurality of coding units. Accordingly, when the prediction units are included in one coding unit, the residual values are generated by performing prediction on one coding unit, and when the prediction units are included in a plurality of coding units, the residual values are generated by performing prediction on the plurality of coding units.

A method of generating the residual values by predicting the prediction units all at once has been described above with reference to FIG. 10.

In operation 1620, the apparatus sets one transform unit by selecting a plurality of prediction units. The prediction units may be included in one coding unit or in a plurality of coding units. The adjacent prediction units may be selected based on depth, or adjacent prediction units on which prediction is performed in a same type of prediction mode may be selected.

In operation 1630, the apparatus transforms the prediction units into a frequency domain according to the transform unit set in operation 1620. Coefficients of frequency domain are generated by performing transform on the transform unit set by grouping the prediction units.

In operation 1640, the apparatus quantizes frequency component coefficients, e.g. the discrete cosine coefficients generated in operation 1630, according to a predetermined quantization process.

In operation 1650, the apparatus entropy-encodes the frequency component coefficients quantized in operation 1640. The entropy encoding is performed via CABAC or CAVLC.

As described with reference to FIG. 14, the method may further include setting an optimum transform unit by repeating operations 1610 through 1640 on different transform units. The optimum transform unit may be set by repeatedly performing transform, quantization, and entropy encoding on the different transform units as shown in FIG. 14.

Figure 17:
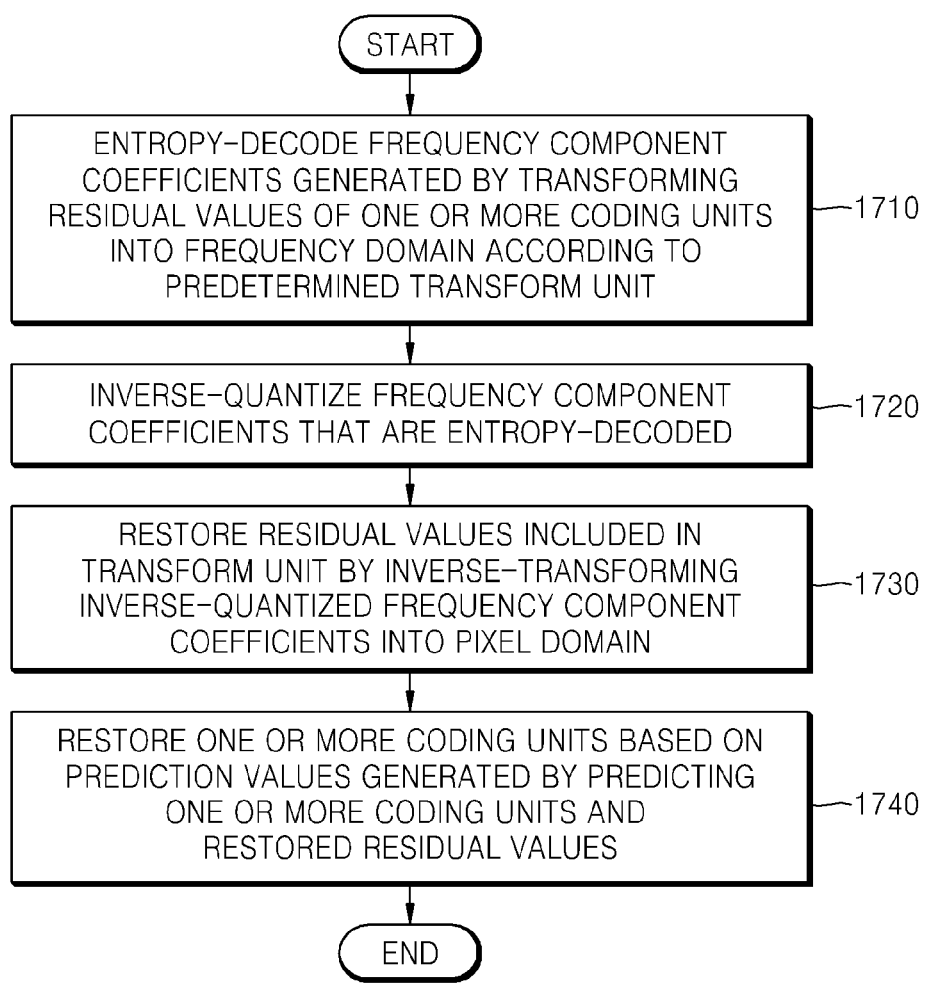
FIG. 17 is a flowchart illustrating a method of decoding an image, according to an exemplary embodiment.

FIG. 17 is a flowchart illustrating a method of decoding an image, according to an exemplary embodiment.

Referring to FIG. 17, the apparatus entropy-decodes frequency component coefficients of a predetermined transform unit, in operation 1710. The frequency component coefficients may be discrete cosine coefficients. The transform unit may be set by grouping a plurality of prediction units. As described above, the prediction units may be adjacent to each other, and may be included in one coding unit or in a plurality of different coding units.

In operation 1720, the apparatus inverse-quantizes the frequency component coefficients that are entropy-decoded in operation 1710. The discrete cosine coefficients are inverse-quantized by using a quantization step used during encoding.

In operation 1730, the apparatus inverse-transforms the frequency component coefficients that are inverse-quantized in operation 1720 into a pixel domain to restore a transform unit. The restored transform unit is set by grouping a plurality of prediction units. Residual values included in the transform unit are restored. Residual values of one coding unit are restored if the prediction units are included in one coding unit, and residual values of a plurality of coding units are restored if the prediction units are included in the coding units.

As described above, the transform unit may be set by grouping adjacent prediction units based on a depth, or by grouping adjacent prediction units on which prediction is performed according to a same type of prediction mode.

In operation 1740, the apparatus restores the one or more coding units based on the residual values included in the transform unit restored in operation 1730. Prediction values are generated by predicting the one or more coding units, and the one or more coding units are restored by adding the generated prediction values and the residual values restored in operation 1730. A method of predicting the prediction values included in one or more coding units has been described above with reference to FIG. 10.

If the transform unit is set by grouping the prediction units included in one coding unit, one coding unit is restored, and if the transform unit is set by grouping the prediction units included in a plurality of coding units, the plurality of coding units are restored.

According to the exemplary embodiments, an image is more efficiently compressed and encoded since a transform unit can be set to have a size larger than a prediction unit, and transform can be performed on the transform unit.

While the present invention has been particularly shown and described with reference to exemplary embodiments thereof, it will be understood by one of ordinary skill in the art that various changes in form and details may be made therein without departing from the spirit and scope of the invention as defined by the following claims and their equivalents. Also, the exemplary embodiments can also be embodied as computer readable codes on a computer readable recording medium.

The image encoding or decoding apparatus or the image encoder or decoder illustrated in FIGS. 1, 2, 4, 5, 9, 11, or 15 may include a bus coupled to every unit of the apparatus or encoder or decoder, at least one processor that is connected to the bus and is for executing commands, and memory connected to the bus to store the commands, received messages, and generated messages.

The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Alternatively, the exemplary embodiments may be embodied as computer readable transmission media in carrier waves or signals for transmission over a network, such as the Internet.

What is claimed is:

1. A method of decoding an image, the method comprising:
    determining a plurality of square maximum coding units from an image and determining a square coding unit which is hierarchically split from a maximum coding unit among the plurality of square maximum coding units using information about a coding unit, wherein the information about the coding unit is parsed from a bitstream;
    determining at least one prediction unit which is split from the coding unit using information about a prediction unit, wherein the information about a prediction unit is parsed from the bitstream;
    determining at least one transformation unit which is split from the coding unit using information about a transformation unit, wherein the information about a transformation unit is parsed from the bitstream;
    reconstructing residuals by performing inverse quantization and inverse transformation on quantized transformation coefficients of a transformation unit parsed from the bitstream; and performing intra prediction or inter prediction using the at least one prediction unit to generate a predictor, and reconstructing the coding unit using the residuals and the predictor, wherein when a prediction mode is determined to be an inter prediction mode and not an intra prediction mode, the method of decoding supports a transformation unit, among the at least one transformation unit, having a size of 2N×2N, that includes four prediction units, among the at least one prediction unit, having a size of N×N, wherein the at least one prediction unit is one among blocks including: a block equal in size to the coding unit; and a block among a plurality of blocks generated by equally dividing at least one of height and width of the coding unit, and wherein the transformation unit is one among blocks including: a block equal in size to the coding unit; and a block among a plurality of blocks generated by equally dividing height and width of the coding unit.

2. The method of claim 1, wherein, a size of the transformation unit is different from a size of a prediction unit among the at least one prediction unit.

3. The method of claim 1, wherein, when the information about a coding unit indicates a split for a coding unit of a current depth, the coding unit of the current depth is split into four square coding units of a depth greater than the current depth, independently from neighboring coding units.

4. The method of claim 1, further comprising:

receiving flag information indicating whether the transformation unit includes a quantized transformation coefficient from among the quantized transformation coefficients, which is not equal to 0.

* * * * *